(12) United States Patent
Miller et al.

(10) Patent No.: US 12,110,245 B2
(45) Date of Patent: Oct. 8, 2024

(54) METHOD AND APPARATUS FOR TREATING NATURAL GAS AND OIL WELL WASTE WATERS FOR REMOVAL OF CONTAMINANTS AND DISSOLVED SOLIDS

(71) Applicant: Eau Midstream, Inc., Phoenix, AZ (US)

(72) Inventors: Francis C. Miller, Livonia, NY (US); Steven B. Addleman, Somerset, PA (US)

(73) Assignee: Eau Midstream, Inc., Phoenix, AZ (US)

( * ) Notice: Subject to any disclaimer, the term of this patent is extended or adjusted under 35 U.S.C. 154(b) by 471 days.

(21) Appl. No.: 16/191,688

(22) Filed: Nov. 15, 2018

(65) Prior Publication Data

US 2019/0248689 A1 Aug. 15, 2019

Related U.S. Application Data

(63) Continuation of application No. 14/765,027, filed as application No. PCT/US2014/014338 on Feb. 1, 2014, now abandoned.
(Continued)

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/441* (2013.01); *C02F 1/463* (2013.01); *C02F 1/66* (2013.01);
(Continued)

(58) Field of Classification Search
CPC .. C02F 9/00; C02F 1/441; C02F 1/463; C02F 1/66; C02F 1/78; C02F 1/004; C02F 1/283; C02F 1/52; C02F 1/5236; C02F 1/56; C02F 1/72; C02F 1/722; C02F 5/02; C02F 5/06; C02F 11/121; C02F 2101/108;
(Continued)

(56) References Cited

U.S. PATENT DOCUMENTS 2,985,307 A 5/1961 Grasmere et al.
5,512,178 A 4/1996 Dempo
(Continued)

FOREIGN PATENT DOCUMENTS

CN 102030435 A1 9/2009
WO 2011026197 A1 3/2011

OTHER PUBLICATIONS

Office Action in U.S. Appl. No. 14/765,027, filed May 16, 2018. EFS file name: 20190616_16-191688_IDS_NPL_cite1.pdf.
(Continued)

*Primary Examiner* — Ekandra S. Miller-Cruz
(74) *Attorney, Agent, or Firm* — Knobbe, Martens, Olson & Bear, LLP

(57) ABSTRACT

A method for treating wastewater is disclosed. The method is useful in particular for treating wastewater that is generated from the process of drilling, hydraulic fracturing and/or cleaning a bore of an oil or natural gas well bore. The method may include performing cold lime softening of the wastewater to form waste salt flocs, filtration of waste salt flocs, ozonation of the filtrate from the filtration, and reverse osmosis of the filtrate to produce a purified permeate.

12 Claims, 13 Drawing Sheets

Related U.S. Application Data

(60) Provisional application No. 61/759,427, filed on Feb. 1, 2013.

(51) Int. Cl.
*C02F 1/28* (2023.01)
*C02F 1/44* (2023.01)
*C02F 1/463* (2023.01)
*C02F 1/52* (2023.01)
*C02F 1/56* (2023.01)
*C02F 1/66* (2023.01)
*C02F 1/72* (2023.01)
*C02F 1/78* (2023.01)
*C02F 5/02* (2023.01)
*C02F 5/06* (2023.01)
*C02F 11/121* (2019.01)
*C02F 101/10* (2006.01)
*C02F 103/10* (2006.01)
*C02F 103/36* (2006.01)

(52) U.S. Cl.
CPC ............... *C02F 1/78* (2013.01); *C02F 1/004* (2013.01); *C02F 1/283* (2013.01); *C02F 1/52* (2013.01); *C02F 1/5236* (2013.01); *C02F 1/56* (2013.01); *C02F 1/72* (2013.01); *C02F 1/722* (2013.01); *C02F 5/02* (2013.01); *C02F 5/06* (2013.01); *C02F 11/121* (2013.01); *C02F 2101/108* (2013.01); *C02F 2103/10* (2013.01); *C02F 2103/365* (2013.01); *C02F 2209/00* (2013.01); *C02F 2209/03* (2013.01); *C02F 2209/05* (2013.01); *C02F 2209/055* (2013.01); *C02F 2209/11* (2013.01)

(58) Field of Classification Search
CPC ............ C02F 2103/10; C02F 2103/365; C02F 2209/00; C02F 2209/03; C02F 2209/05; C02F 2209/055; C02F 2209/11
USPC ........................................................ 210/638
See application file for complete search history.

(56) References Cited

U.S. PATENT DOCUMENTS

| | | |
|---|---|---|
| 5,635,071 A | 6/1997 | Al-Samadi |
| 5,643,443 A | 7/1997 | Ishikura |
| 6,338,789 B1 | 1/2002 | Hecking |
| 7,344,647 B2 | 3/2008 | Stewart |
| 7,931,816 B2 | 4/2011 | Conger et al. |
| 7,967,988 B1 | 6/2011 | Miller |
| 7,972,517 B1 | 7/2011 | Miller |
| 2001/0007314 A1 | 7/2001 | Sherman |
| 2007/0034571 A1 | 2/2007 | Costa et al. |
| 2007/0102359 A1 | 5/2007 | Lombardi et al. |
| 2008/0237141 A1 | 10/2008 | Kerfoot |
| 2009/0173692 A1 | 7/2009 | Laraway |
| 2010/0125044 A1 | 5/2010 | Keister |
| 2010/0300966 A1 | 12/2010 | Kelsey et al. |
| 2010/0314327 A1 | 12/2010 | Lean et al. |
| 2011/0042320 A1 | 2/2011 | Allen |
| 2011/0094965 A1 | 4/2011 | Al-Samadi |
| 2012/0145643 A1 | 6/2012 | Pandya |
| 2012/0279925 A1 | 11/2012 | Miller et al. |

OTHER PUBLICATIONS

Loraine Huchler, "Is Your Cold Lime Softener Effective," 41-48 CEP (2007). EFS file name: 20190616_16-191688_IDS_NPL_cite2..pdf.

Nicholas P. Cherennisinoff, "Handbook of Water and Wastewater Treatment Technologies," Chapter 3, Chemical Additives That Enhance Filtration, 103-104 (2002). EFS file name: 20190616_16-191688_IDS_NPL_cite3.pdf.

METHOD AND APPARATUS FOR TREATING NATURAL GAS AND OIL WELL WASTE WATERS FOR REMOVAL OF CONTAMINANTS AND DISSOLVED SOLIDS

This application is a continuation of copending U.S. patent application Ser. No. 14/765,027, which is a national stage application under 35 U.S.C. 371(c) of PCT Application No. US2014/014338 filed Feb. 1, 2014, which claims the benefit of U.S. Provisional Application for Patent No. 61/759,427, filed Feb. 1, 2013. The above benefit/priority claims are being made in an Application Data Sheet submitted herewith in accordance with 37 C.F.R. 1.76 (b)(5) and 37 C.F.R. 1.78. This application is also related to the inventions disclosed in U.S. patent application Ser. No. 12/914,072 filed Oct. 28, 2010, which claims priority from U.S. Provisional Application for Patent No. 61/255,504, filed Oct. 28, 2009; and U.S. patent application Ser. No. 13/461,871 filed May 2, 2012, which claims priority from U.S. Provisional Application for Patent No. 61/481,370, filed May 2, 2011. The disclosures of all of these United States patent applications are incorporated herein by reference.

TECHNICAL FIELD

This invention relates to the removal of contaminants from waste water discharged at a gas wellhead, and more particularly to the removal of contaminants from water that is used during the process of drilling, hydraulic fracturing and/or cleaning a well bore, and then subsequently discharged from the wellhead.

BACKGROUND ART

Natural gas and oil well drilling, hydrofracing and production operations produce significant volumes of waste water containing low (500 to 5,000 PPM) and medium (5,000 to 50,000 PPM) concentrations of dissolved solids, i.e. salts, as a waste solution. This waste water is typically disposed of in conventional injection wells or stored for reuse in subsequent hydrofracing or drilling operations. Due to various logistical limitations this water may not be readily and/or cost effectively disposed in injection wells. In addition, the elevated levels of dissolved salts or total dissolved solids (TDS) in the water produce a potential for contamination of subsurface and surface waters from compromised storage systems. Therefore certain restrictions through new and proposed regulations in many jurisdictions limit the means and/or increase to cost of storage of the water for reuse or awaiting disposal.

Conventional methods of storage of this waste have included lined ponds and impoundments as well as batteries of "frac" tanks. New regulations require secondary containment around the frac tanks and specially lined ponds and impoundments with requirements for routine and expensive integrity testing of the pond and impoundment liners. Certain testing regulations require the emptying and cleaning of such ponds and impoundments on a monthly basis to complete such testing. This often requires the trucking and disposal of the waste water prior to its reuse; or its repetitive relocation with trucking, which often renders its reuse uneconomical. The utilization of batteries of frac tanks for storage of this water becomes expensive and logistically difficult in remote regions. Some of these brine waste waters could be reused in specific applications in the drilling and/or hydrofracing process if they could be readily treated to a site specific desired saline concentration level.

Waste waters from natural gas and oil drilling, hydrofracing and production operations contain a significant variety of dissolved and suspended organic and inorganic materials. The contaminants in the water include many of the following constituents:

Sodium chloride.
Barium salts—typically in either the soluble chloride form or the insoluble sulfate form which may be a component of the drilling mud.
Strontium salts—typically in either the soluble chloride form, or the insoluble sulfate form which may be component of the drilling mud.
Calcium and magnesium (hardness) salts—typically in the bicarbonate and or chloride form.
Soluble sulfate salts.
Volatile organic compounds (VOC) resulting from the degradation of the ancient sea creatures captured within the shale formation. (This may include small amounts of crude oil.)
Residual organic compounds (ROC) from the water treatment chemicals introduced into the drilling water to enhance the drilling process.
Residual fracing sand
Pulverized rock cuttings.
Bentonite clay, which may be a component of the drilling mud.
Soluble boron salts.
Soluble bromide salts.
Soluble carbonate salts (carbonate alkalinity)
Soluble hydroxide salts (hydroxide alkalinity)

There are multiple reverse osmosis (RO) methods and equipment available which have the capability of reducing the saline content of water. However, each of these is provided as an individual component for a specific waste stream. In addition, multiple additional components are required to condition the water to remove the remaining aforementioned contaminants other than the common sodium, calcium and magnesium salts in order to achieve effective saline reduction within a given RO system. Furthermore, to the best of the Applicants' knowledge, a portable integrated system treating multiple and variable water sources and producing customizable saline levels in the effluent is not available.

What is needed is an integrated, flexible portable waste treatment system to pretreat and condition this waste water to mitigate the problems associated with them within the RO process and then reduce the saline concentration of these waters to a level which government regulations will permit its storage along with fresh water being accumulated for hydrofracing operations; or alternately, to a level which will permit direct reuse of the waste water as a custom formulated brine. This will provide for recovery and recycling of a high percentage of this waste water.

DISCLOSURE OF THE INVENTION

The applicant has developed a process and apparatus to meet this need. The process is fully integrated, multistage, fully portable, fully automated, and highly flexible, such that it will reduce the saline content of these waste waters to customized levels appropriate for simplified storage or specialized reuse.

The process and apparatus perform a clarification stage in which organic matter and/or suspended solids are removed, a softening stage, when required, at any concentration of precipitatable carbonate, sulfate and/or hydroxide salts which precipitates and removes the precipitated solids from an influent stream of waste water. Residual organic matter from the clarified feed water is then oxidized utilizing an advanced ozone oxidation process to prevent organic fouling of the reverse osmosis (RO) membranes. Subsequent to the oxidation process, residual ozone is destroyed and any trace organic matter is absorbed by carbon filtration to prevent damaging of the membranes by residual ozone or fouling by organic contaminants. In certain embodiments, the RO system is a customized system with multiple stages and bypass configurations. The RO system is designed to reduce saline levels as high as 50,000 PPM of total dissolved solids (TDS) to approximately 10 PPM TDS. Alternatively, it may treat lower influent saline levels to required levels and also accommodate higher TDS effluent levels.

From study of extensive samples of oil and natural gas well waste waters, the Applicants have determined that many sources of these waters have been found to be absent of excessive levels of precipitate forming anions such as carbonate and hydroxide. In such instances, the softening stage may be bypassed. The absence of these ions enables the reverse osmosis membrane to achieve removal of the calcium and magnesium chloride salts without concern for blinding of the membranes with problematic precipitates of the metal salts. This is dependent upon adequate pretreatment for removal of suspended solids and organic matter. At low concentrations of these anions, acidification of the influent with hydrochloric acid may be utilized to mitigate the risk of these precipitates, with softening bypassed, by reaction of the carbonate ions to form $H_2O$ and carbon dioxide gas, and of the hydroxide ions to form $H_2O$ and dissolved sodium chloride. The level of these ions allowing for this method of treatment is determined through the determination of the Langelier Saturation Index or similar index for a given influent.

The Applicants have also discovered that where free barium and strontium ions are present in the influent there is almost exclusively an absence of sulfate ions which would lead to gypsum (calcium sulfate), barite (barium sulfate) and celestite (strontium sulfate) scale deposition within the RO membranes. In these cases, coupled with the absence of carbonate and hydroxide ions as discussed above, precipitation of salts of these metals within the reverse osmosis membranes is also mitigated and removal of the chloride salts is achieved through reverse osmosis.

At low concentrations of the carbonate and hydroxide anions, in the absence of sulfates, acidification of the reverse osmosis influent with hydrochloric acid may be utilized to mitigate the risk of the barium and strontium associated precipitates by reaction of the carbonate ions to form $H_2O$ and carbon dioxide gas and of the hydroxide ions to form $H_2O$ as discussed above with calcium and magnesium.

Particular sources of water require the removal of boron. In such cases the waste water must be presented to the reverse osmosis membranes at a pH between 10 and 11 in order to achieve maximum removal of the boron. The selection of membranes is an important consideration in treating boron contaminated water, as not all membranes are suitable for maximum boron removal. Additionally the concentrate produced from the removal of boron with reverse osmosis may require chemical treatment to accommodate cost effective disposal. This concentrate may be treated in a precipitation process utilizing magnesium chloride at elevated pH conditions to achieve a significant reduction of the boron.

Influent containing limited levels of sulfate ions may be processed effectively through the reverse osmosis system through the utilization of scale inhibiting compounds. Acceptable levels of sulfate are determined through the determination of the Langelier Saturation Index or similar index for a given influent as well.

Particular sources of water requiring TDS reduction may be delivered to the instant process at elevated temperatures as a result of their source. In certain situations, the effluent from the instant process must be provided at as high a temperature as possible to accommodate specific requirements. In such cases, performance of the RO process at elevated temperatures is required. In certain embodiments, this may be accomplished by utilization of a particular selection of membranes under specific conditions, in addition to providing means to limit the heat loss from the fluid as it passes through the entire system.

More specifically, in accordance with the present disclosure, the problem of reducing the saline content of wastewater from a gas or oil well drilling operation is solved by a method comprising performing cold lime softening, filtration of waste salt flocs formed by the softening, ozonation of the filtrate from the filtration, and reverse osmosis of the filtrate to produce a purified permeate. In certain embodiments, the performing cold lime softening may comprise the steps of softening chemical injection, flocculation chemical injection, and a filtration to remove precipitated/flocculated contaminants from the waste water. In certain embodiments, an electric field induced ionic precipitation may be performed as an alternative to or in addition to the softening chemical injection.

More specifically, in certain embodiments, the cold lime softening may be comprised of delivering a stream of the wastewater through a first conduit while injecting a solution of sodium carbonate into the first conduit, and causing mixing of the sodium carbonate solution with the stream of wastewater; collecting a soda ash treated volume of the mixed stream of wastewater and sodium carbonate solution in a first holding vessel; delivering a stream of the soda ash treated volume from the first holding vessel through a second conduit while injecting a solution of calcium hydroxide into the second conduit, and causing mixing of the calcium hydroxide solution with the soda ash treated stream and precipitation of waste salts; collecting a lime treated volume of the mixed stream of soda ash treated volume and calcium hydroxide solution in a second holding vessel and holding the lime treated volume in the second holding vessel during further precipitation of waste salts; delivering a stream of the lime treated volume containing precipitated waste salts from the second holding vessel through a third conduit while injecting a coagulant solution into the third conduit, and causing mixing of the coagulant solution with the precipitated waste salt containing stream; collecting a volume of the mixed coagulant solution and precipitated waste salt containing stream in a third holding vessel; and delivering a stream of the coagulant solution and precipitated waste salt containing volume from the third holding vessel through a fourth conduit while injecting a flocculant solution into the fourth conduit, and causing mixing of the flocculant solution with the coagulant solution and precipitated waste salt containing stream and further causing formation of waste salt flocs suspended in the stream flowing through the fourth conduit.

The filtration may be performed by delivering the waste salt flocs suspended in the stream flowing through the fourth conduit to a filtration system, and separating the received stream into solid waste salt flocs and a first filtrate. Organic contaminants in the filtrate may be decomposed by delivering a stream of the first filtrate through a fifth conduit and injecting ozone into the stream of the first filtrate to produce a stream of an ozonated filtrate. The filtrate may be further purified by delivering the stream of the ozonated filtrate through a reverse osmosis system, and separating the ozonated filtrate into a purified permeate and a concentrate.

In circumstances in which the concentration of boron in the waste water remains above acceptable levels for discharge, the method may be further comprised of a boron removal method. In certain embodiments, the boron removal method may be comprised of an acidification stage, a magnesium chloride addition stage, an alkalization/precipitation stage, and a filtration stage.

Additionally, the problem of reducing the saline content of high temperature wastewater from a gas or oil well drilling operation is solved by utilization of membranes of a particular construction, which accommodate the elevated feed temperatures and also seal and gasket materials similarly suited for the elevated temperatures.

BRIEF DESCRIPTION OF THE DRAWINGS

The present disclosure will be provided with reference to the following drawings, in which like numerals refer to like elements, and in which.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

BEST MODE FOR CARRYING OUT THE INVENTION

Figure 1:
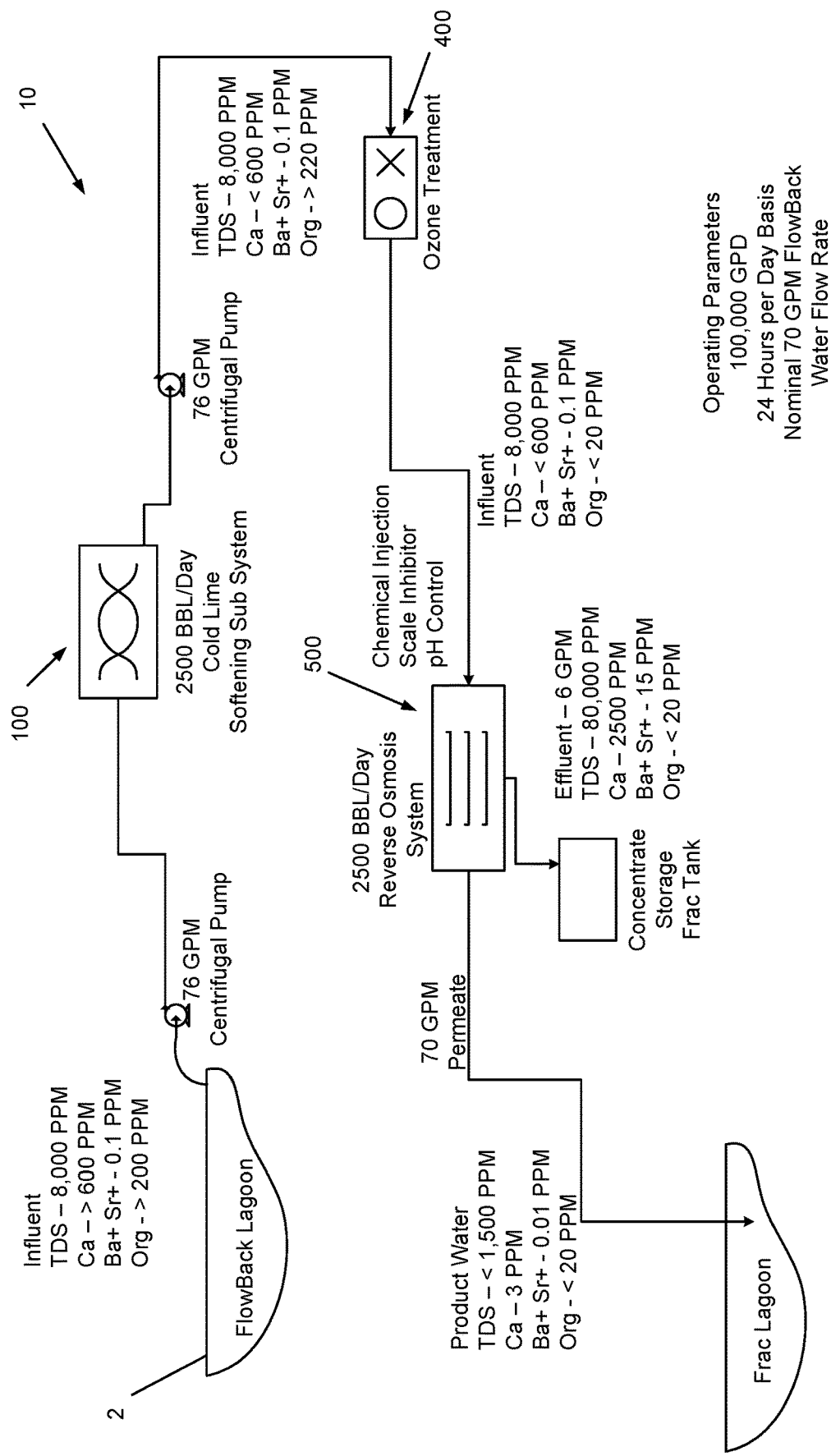
FIG. 1 is a general schematic diagram of the Applicants' apparatus for treating natural gas and oil well waste water.

Referring first to FIG. 1, the Applicants' apparatus for treating natural gas and oil well waste water is comprised of a pretreatment system for removal of dissolved and suspended organic matter and suspended inorganic matter in a manner similar to that disclosed in the aforementioned patent application Ser. No. 13/461,871 of Miller, et al., a cold soda lime softening subsystem 100, an ozone treatment subsystem 400, and a reverse osmosis system 500.

The pretreatment system is not shown in FIG. 1, but is provided between the wastewater lagoon 2 and the softening subsystem 100. The pretreatment system will now be described, as disclosed in patent application Ser. No. 13/461,871 of Miller, et al., as well as Patent Cooperation Treaty (PCT) Application No. PCT/US2012/036050, the disclosure of which is incorporated herein by reference. The remainder of the Applicants' methods and apparatus will then be described with reference to FIGS. 2-13.

The pretreatment system may function as a clarification stage for the overall wastewater treatment. In certain embodiments, the clarification stage in which organic matter and/or suspended solids are removed is a multi-stage combined oxidation, coagulation, flocculation and filtration process. More specifically, the method comprises decomposing organic contaminants in the effluent by bubbling a gas containing ozone through the effluent; adding a coagulant to increase the particle size of solid particles contained in the effluent; adding a flocculant to increase the particle size of solid particles contained in the effluent, thereby forming flocs suspended in the effluent; and filtering the flocs from the effluent to produce a filtrate and flocculated solids.

The ozone concentration in the gas is preferably at least one percent by weight. The size of the gas bubbles is preferably less than 500 microns in diameter. The pH of the effluent during ozonation (gas bubbling) is preferably between 3 and 10. For most waste water effluent mixtures (also referred to herein as "pit water"), the ozone treatment will operate in the range of 10 ppm ozone to 50 ppm ozone concentration with a pit water effluent average residence time in the apparatus (not shown) of between approximately 10 and 30 minutes. The method may further comprise causing pin flocs to form in the effluent by adding the coagulant. The method may further comprise adding the coagulant into a stream of effluent flowing within a first conduit under controlled shear conditions, and adding the flocculant into a stream of effluent containing pin flocs flowing within a second conduit under controlled shear conditions.

The method may further comprise delivering the effluent containing the suspended flocs into a filter through a conduit floating in a portion of the effluent contained in a filter. The filter may be an "active filter" comprised of a housing, a filter medium, and at least one inflatable bladder disposed between the housing and the filter medium. One suitable active filter is the "DryBox" filtration system sold commercially by Innovative environmental Products, Inc. of Livonia, NY under license from Idee e Prodotti S.r.l. of Cavenago Brianza, Italy. This filter is provided in multiple solid holding capacities ranging from 5 cubic feet up to 40 cubic yards. Alternately, other filtration devices such as a plate and frame filter press, rotary drum filter or other such commercial device may be utilized, with the process, but without a floating conduit.

Specifically the clarification stage process is comprised of the sequential addition and timed reaction of chemicals for the coagulation of the contaminants and their subsequent and flocculation and filtration. The waste water that is discharged from the wellhead of an oil or gas well being drilled may be captured and directed into a tanker truck, which may transport the waste water to a storage tank(s) or alternately a lagoon, and transfer the drilling waste water thereto. Alternatively, the drilling waste water may be captured and pumped directly into the storage tank if the drilling waste water treatment apparatus is located near the wellhead. The process is typically also installed contiguous to the outlet of an ozonation treatment process, wherein the storage tank, or lagoon, may be between the ozonation process and the coagulation and flocculation step.

Some or all of the clarification stage apparatus may be mounted on a flatbed trailer or in an enclosed trailer so as to make it transportable as a tractor trailer rig or smaller tongue style trailer. In one embodiment, most of the apparatus is mounted on or in a trailer, with one or more "roll-off" box-type filters being separately transportable. The apparatus is comprised of various tanks, pumps, filtration device(s) and other equipment for performing coagulation, flocculation and filtration operations on the drilling waste water. A portion of drilling waste water is delivered into a tank or tanks "equalization," i.e., accumulation and mixing of the influent stream to dampen out variations in the chemical and/or physical character of the waste water.

The equalized waste water is typically treated with ozone, in a suitable source or apparatus. Ozonation is used to decompose any organic contaminants contained in the waste water to carbon dioxide and water. In gas well drilling, these organic components originate primarily from "oil based" constituents that are added to the drilling fluids.

The ozonation treatment requirements are dependent upon the constituents of the waste water such as metals, bacteria, $H_2S$, hydrocarbons, etc., as well as total organic carbon (TOC) and biochemical oxygen demand (BOD) of the constituents, and temperature and pH. With the exception of the pH, all of the variation in constituents may be accommodated by adjustments to the ozonation process. The Applicants have found that for the ozonation process to work most effectively, the pH level is generally required to be between 3 and 10, but the system will still function outside this range. For most pit water mixtures, the ozone treatment will operate in the range of 10 ppm ozone to 50 ppm ozone concentration with a pit water average residence time in the apparatus of between approximately 10 and 30 minutes. Pit water having elevated level of hydrocarbons and BOD may require the oxidation/contact chamber in the apparatus to be pressurized and the dwell time extended. The required pressure may be approximately in the range of 1 to 5 psi and the dwell time extended to between approximately 30 and 60 minutes.

The Applicants have discovered that the size of ozone bubbles needed to accomplish complete oxidation of contaminants is important. Diffusion of ozone gas into water from a sintered pipe or similar device will normally be insufficient for treatment of the pit water. The use of microbubbles with a diameter of approximately 5 to 500 microns is normally sufficient. The microbubbles may be formed by using a venturi contact system such as is commercially available and well known in the art. However, pit waters with elevated levels of contamination above 50 milligrams/liter (mg/l) hydrocarbons, 250 mg/l TOC, and/or 500 mg/l BOD will require the infusion of nanobubbles with a diameter of approximately 0.1 up to 4 microns delivered under pressure with lengthened residence time of approximately 30 to 60 minutes. The concentration of ozone in the ozone/oxygen gas is preferably at the highest percent by weight available, in the range of approximately 6 percent to 10 percent, in order to optimize the efficiency of the operation. In certain embodiments, the concentration of ozone in the ozone/oxygen gas may up to 14 percent.

During commercial operation of the apparatus the Applicants observed that in addition to the ozone, utilization of varying yet minute quantities of hydrogen peroxide in conjunction with the ozone produced an advanced oxidation condition within the waste water. By using the minute quantities of hydrogen peroxide, the efficacy of the oxidation of the organic matter was significantly increased as seen with the filtrate as discussed below. In certain embodiments, the quantity of hydrogen peroxide added may be at molar ratio relative to ozone of between 2.4 and 7.3.

Following the ozone treatment step, a coagulant is introduced from a source into the drilling waste water, which is a slurry containing suspended solids such as rock dust and drilling mud. This coagulant forms a fine "pin floc" of the suspended and settling materials which will later be formed into a larger floc suitable for efficient filtration. The optimum coagulant for this application has been determined to be a metal chloride, such as aluminum chlorohydrate. Multiple alternate metal chlorides may also be utilized; however, following extensive testing including ferric chloride as the coagulant, the Applicants have determined that the aluminum chlorohydrate is visibly, significantly more effective in terms of formation of the pin floc under varying conditions and concentrations of the solids in the pit water. The addition ratio of the coagulant has been determined to be approximately 0.001 to 0.01 parts of the coagulant per part of the solution, although higher concentrations may be used if the waste water has higher percent solids or has been pre-treated to concentrate it. The coagulant may be introduced to the suspended solids slurry as a neat (concentrated liquid) material or as a diluted aqueous solution provided from a vessel, depending upon the site specific requirements and available feed equipment. It may be delivered through a conduit and blended and reacted with the slurry in either a batch or continuous tank.

Alternatively, the waste water slurry may be provided as a continuous feed into a moving flow of the slurry in a conduit. The Applicants have discovered that optimum coagulation occurs in when the section of the conduit that is downstream from the coagulant injection point is a corrugated 1½" diameter hose which has a length of approximately 20 to 50 linear feet and the velocity is approximately 4 to 12 feet per second.

During commercial operation of the apparatus the Applicants observed that in addition to producing pin flocs of the suspended matter, the aluminum chlorhydrate also extracted residual soluble organic matter from the waste water and formed a pin floc of the of the extracted material. This was an unexpected outcome. The Applicants also observed that this floc was quite sensitive to excessive shear.

Following the formation of pin flocs by the introduction of coagulant, an anionic flocculant is added to the slurry. This flocculant forms the pin flocs into large flocs which are suitable for efficient filtration. In one embodiment, the optimum coagulant for this application has been determined to be anionic polyacrylimide F-303AH as provided by Water Specialists Technologies, LLC of Sanford, Florida. However multiple alternate anionic poly acrylimides may also be utilized. The addition ratio of the flocculant has been determined to be approximately 0.0001 to 0.0005 parts of the flocculant per part of the solution.

The flocculant may be introduced to the flowing pin floc slurry in a conduit as a diluted aqueous solution in the range of 0.1% to 0.5% concentration depending upon the site specific requirements and available feed equipment. It may be blended and reacted with the pin floc slurry into a downstream continuous flocculation tank, or as a continuous feed into a moving flow of the pin floc slurry in a pipe or other conduit. The Applicants have discovered that optimum flocculation occurs when the conduit is a corrugated 1½" diameter hose which has a length of approximately 20 to 50 linear feet and the velocity is approximately 4 to 12 feet per second.

The now flocculated slurry is introduced into a filtration system. The filtration system may be comprised of one or more active filter(s), wherein solids are captured on a filter medium, and then dewatered by the action of inflatable bladders disposed against the medium and the filtrate passes through and is collected for further treatment. One suitable active filter is the "DryBox" filtration system sold commercially by Innovative environmental Products, Inc. of Livonia, NY under license from Idee e Prodotti S.r.l. of Cavenago Brianza, Italy. This filter is provided in a multiple solid holding capacities ranging from 5 cubic feet up to 40 cubic yards.

In order to perform the filtration step with the active filter, floc-containing waste water is delivered through an inlet conduit into the filter from the floc formation conduit. The Applicants have discovered that for the most effective filtration, it is beneficial to introduce the floc-containing waste water through a floating conduit. The floating conduit may be made of a buoyant material such as a foam, or it may be comprised of separate buoyant members. In operation, as floc-containing waste water is delivered into the filter, the conduit floats upon the waste water and gently discharges the flocs so as to not disrupt them.

The Applicants have discovered through experimentation that in many instances the free cascading of the flocculated solids from a pipe down into the dewatering box has a tendency to disrupt the stability of the floc and reduce the filtration performance of the dewatering operation. Thus the use of a floating conduit to introduce the floc into the filter housing is beneficial.

A first portion of filtrate flows through a filter medium contained within the active filter by the action of gravity and out of an outlet. A cake of sludge is retained by the filter medium. Subsequently, a step is performed in which the sludge is dewatered. The bladders disposed against the filter medium are actuated to manipulate the sludge cake, resulting in the discharge of a second portion of filtrate. The bladders may be repeatedly inflated and deflated in programmed sequences, thereby manipulating the sludge on the filter medium in a manner that maximizes the dewatering thereof.

As alternatives to the box filter and other active filters, various other static style gravity filtration systems available to the industry may be used as the filtration system. These include common filtration boxes as provided by Rain for Rent (25 Yard Filter Box) or Flotrend (models RB-25-O-GN-VPF, RB-20-O-GN, RB-20-C-B and/or RB-25-O-GN-S) and other similar agents and various applications of the Geotube® as provided by Marifi Company. These systems perform substantially the same function as the box filter. However, the "active filtration" process of the filter is believed to provide enhanced and accelerated dewatering of the filtered solids and is significantly less sensitive to problems associated with upsets in the coagulant and flocculant feed systems. These filters may be configured with a floating conduit in a manner similar to the floating conduit described above. In addition, the Squeeze Tower Press manufactured and sold commercially by Idee e Prodotti S.r.l. of Cavenago Brianza, Italy, also an active filtration device, may be suitable under conditions requiring finer filtration at lower solids loading rates. Alternately, other filtration devices such as a plate and frame filter press, rotary drum filter or other such commercial device may be utilized with the pretreatment system and process.

The dewatered sludge is discharged from the box filter. Since the box filter is of a roll-off construction, the entire box filter may be drawn onto a truck and transported to a suitable dumping site. The dewatered sludge product of the process, based upon the ozonation and the chemical coagulation, may be suitable for disposal in a conventional non-hazardous landfill.

The filtrate waste water that is discharged from the box filter may be discharged into a sump tank from which it may be transferred for further treatment. The treatment may be as described subsequently herein with reference to FIGS. 2-13.

Figure 13:
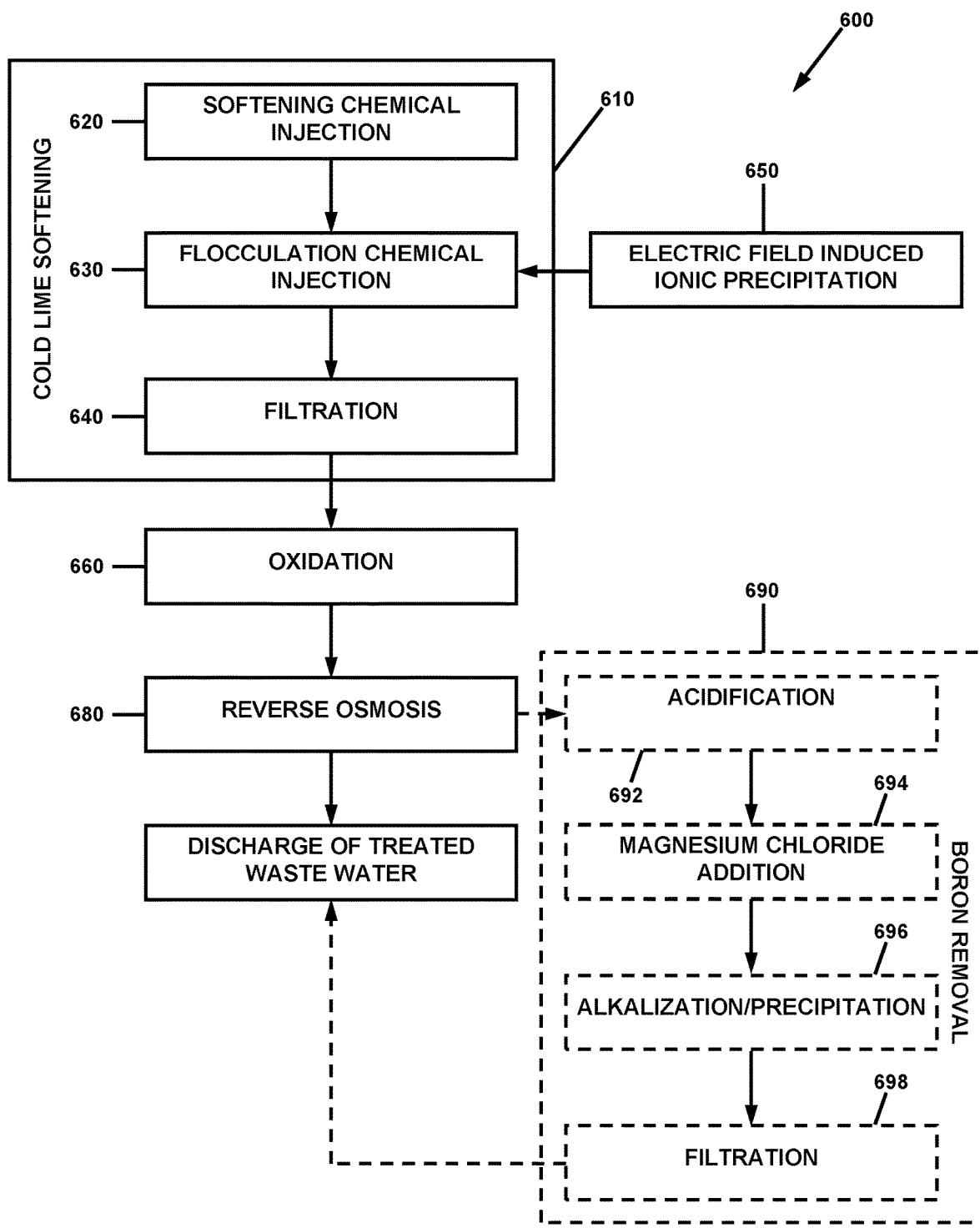
FIG. 13 is a flowchart that depicts various embodiments of a method for treating natural gas and oil well waste waters in accordance with the present disclosure.

Referring first to FIG. 13, the Applicants' method 600 for further treating natural gas and oil well waste water is comprised of performing cold lime softening 610, wastewater ozonation 660, and reverse osmosis 680. Each of these operations comprises certain suboperations which will be described subsequently herein.

In certain embodiments, the apparatus may include an alternative softening system utilizing electrical signals imparted into the solution to enhance anion and cation attraction and hardness precipitation without pH controls, as will be described subsequently with reference to FIG. 9. In these embodiments, the Applicants' method 600 includes ionic precipitation 650.

Figure 2:
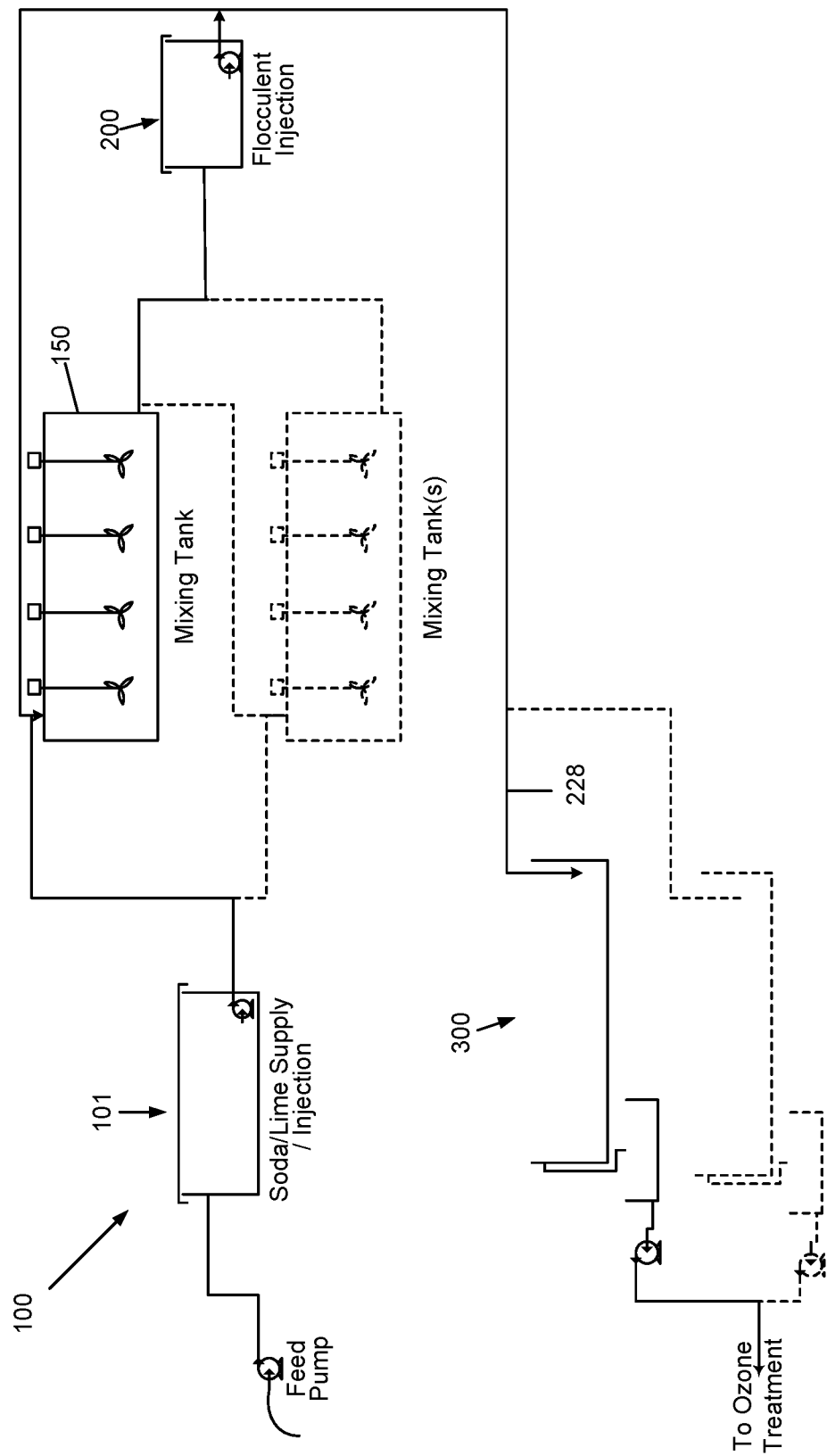
FIG. 2 is a schematic diagram of a cold soda/lime softening subsystem portion of the Applicants' apparatus of FIG. 1.
Figure 3:
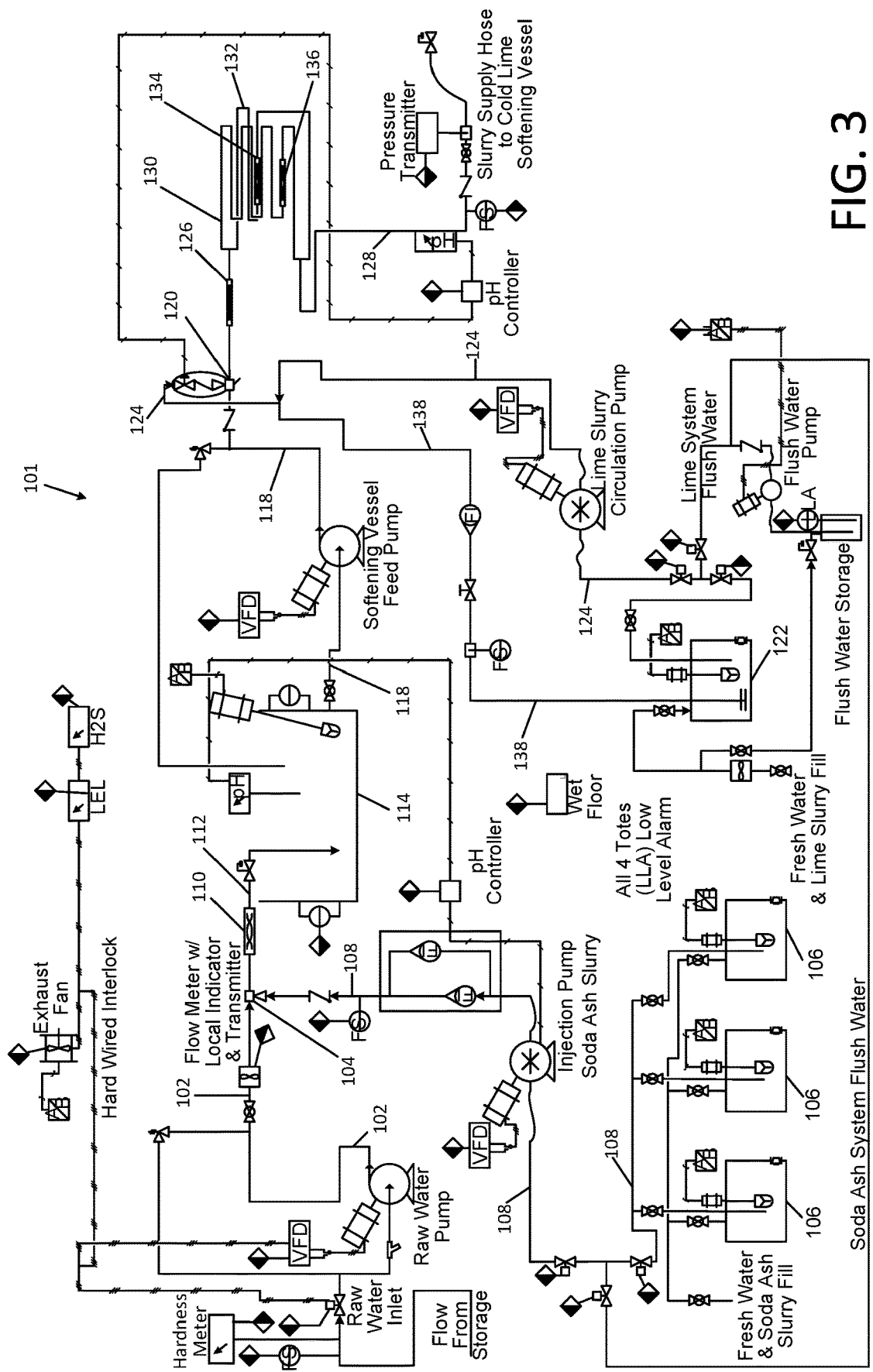
FIG. 3 is a detailed schematic diagram of a cold soda/lime softening chemical injection portion of the cold soda/lime softening subsystem of FIG. 2.
Figure 4:
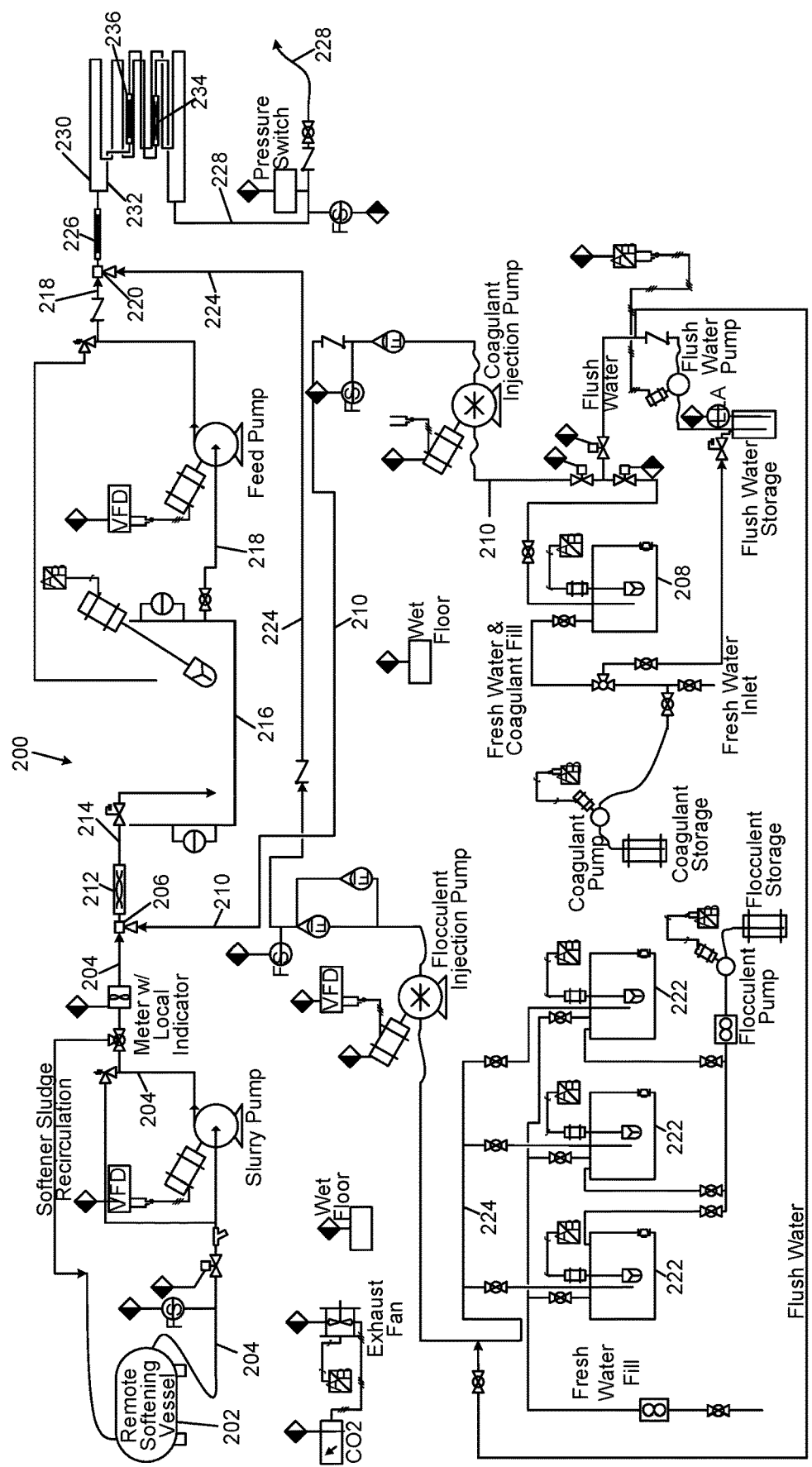
FIG. 4 is a detailed schematic diagram of a flocculation chemical injection portion of the cold soda/lime softening subsystem of FIG. 2.
Figure 5:
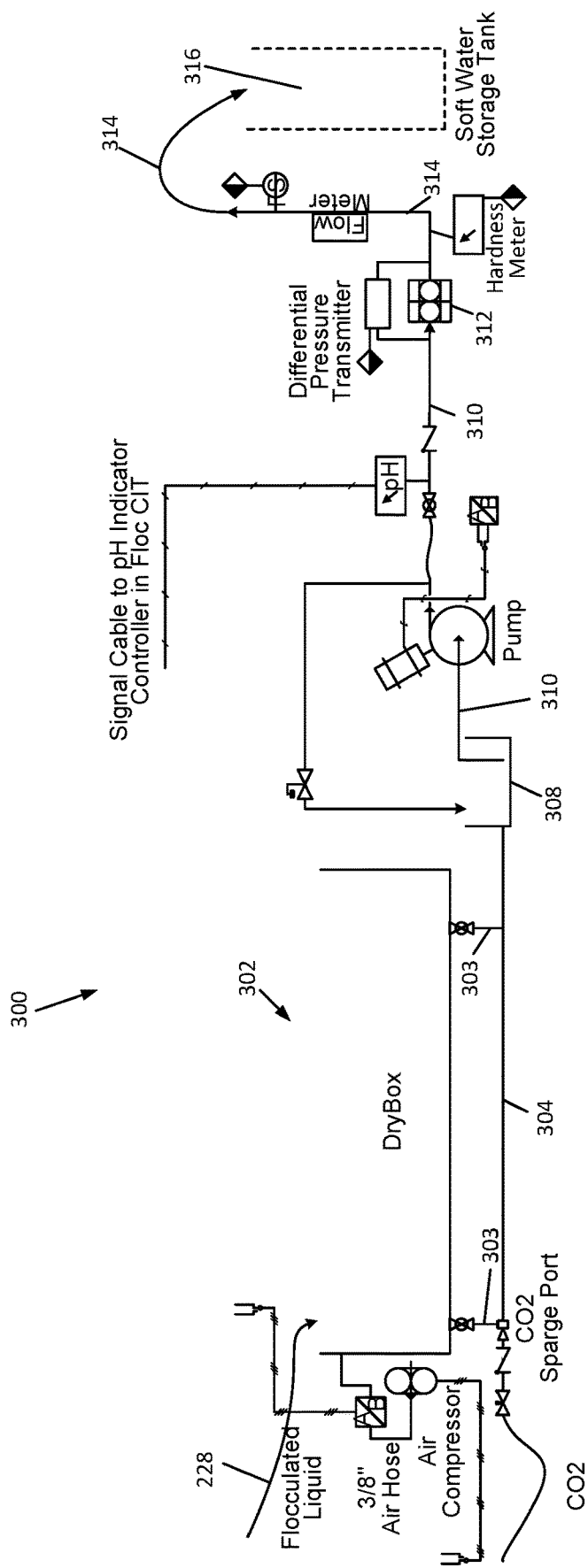
FIG. 5 is a detailed schematic diagram of a filtration system portion of the cold soda/lime softening subsystem of FIG. 2.
Figure 6:
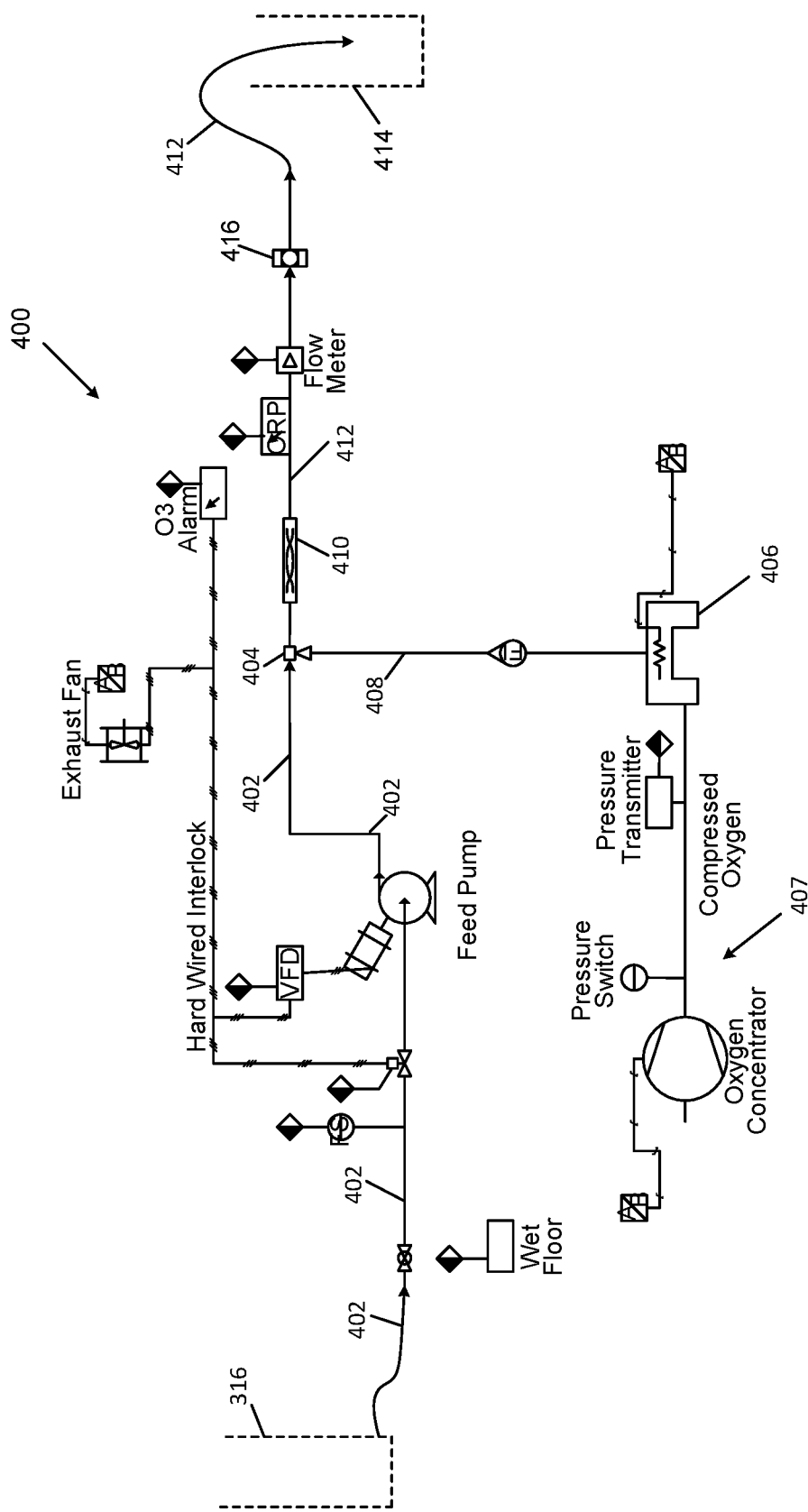
FIG. 6 is a schematic diagram of an ozonation subsystem portion of the Applicants' apparatus of FIG. 1.
Figure 7:
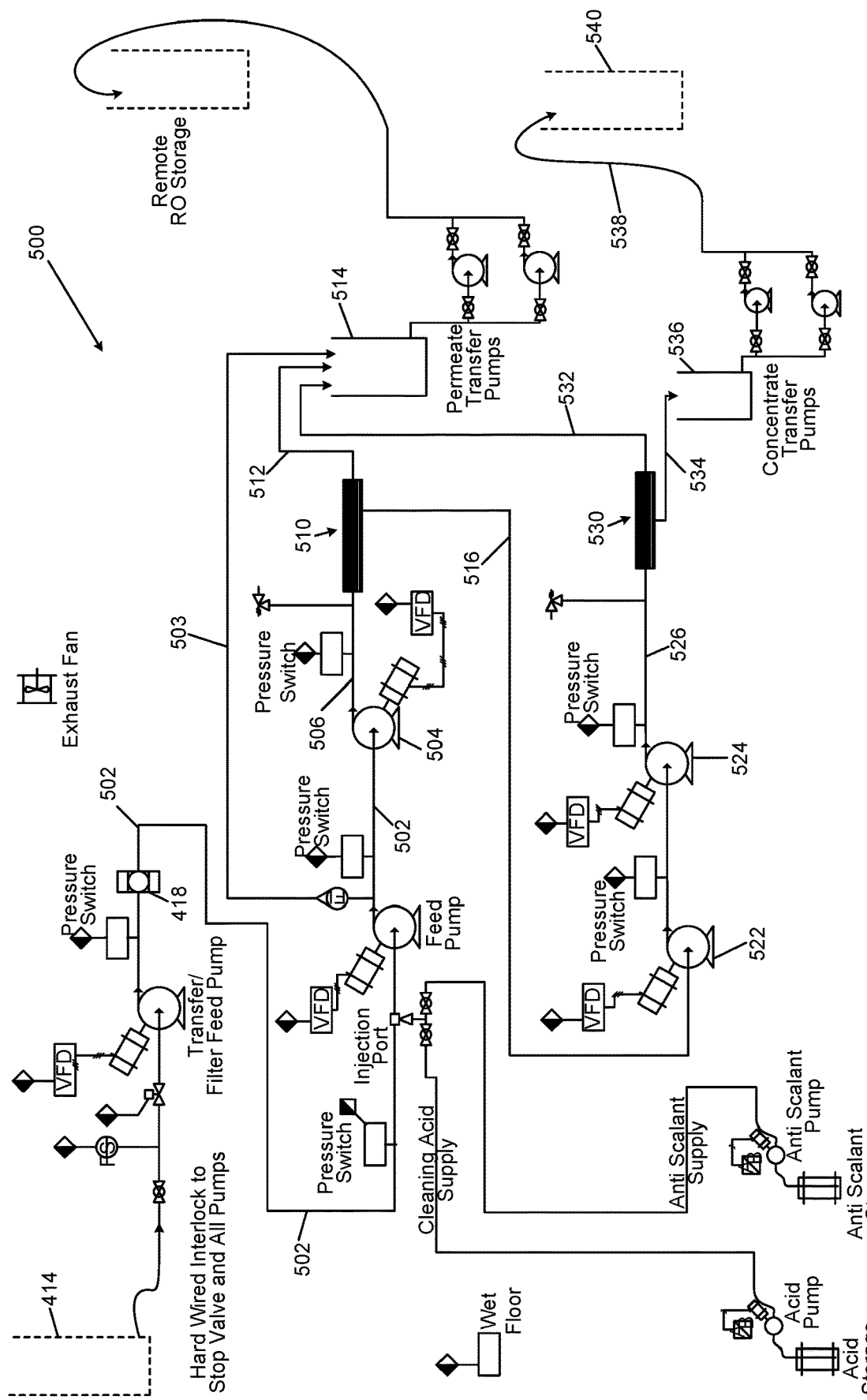
FIG. 7 is a schematic diagram of a reverse osmosis subsystem portion of the Applicants' apparatus of FIG. 1.

Referring also to FIG. 2, the cold soda lime softening subsystem 100 is comprised of a cold soda lime softening chemical injection portion 101, a flocculation chemical injection portion 200, and a filtration system portion 300. Referring also to FIG. 13, the Applicants' cold lime softening operation is comprised of softening chemical injection 620, flocculation chemical injection 630, and a filtration 640. Schematic diagrams in FIGS. 3, 4, and 5 illustrate the chemical injection portion 101, flocculation chemical injection portion 200, and filtration system portion 300, which perform these respective steps, in further detail; and the schematic diagrams in FIGS. 6 and 7 illustrate ozone treatment subsystem 400 and a reverse osmosis system 500 for performing ozonation (oxidation) 660 and reverse osmosis 680 of FIG. 13, respectively. (It is to be understood that the various labels in FIGS. 1-12 that indicate process capacities, flow rates, temperatures, pressures, pHs, equipment specifications, and other details are meant to be exemplary and not limiting. The Applicants' apparatus and method may be operated at many other conditions and with many other equivalent components and achieve satisfactory results.)

Turning again to FIGS. 1 and 2, waste water is accumulated in frac tanks (not shown) or in an appropriately lined lagoon 2 or impoundment. In one embodiment, the influent waste water may be mixed in nominal 20,000 gallon feed tanks (not shown) and alternately fed to the process. One tank may be filling and mixing while the alternate tank is feeding the process while continuing to mix. A first step of the Applicants' method is the sequential addition of soda ash (sodium carbonate), and then lime (calcium hydroxide), into the influent waste water. Referring to FIG. 3, a cold soda lime softening chemical injection portion 101 of the apparatus is provided for these operations 620 of FIG. 13. In certain embodiments, the portion 101 of the apparatus may be made portable by providing it on a flatbed trailer or in an enclosed trailer so as to make it transportable as a tractor trailer rig or smaller tongue style trailer, in a manner similar to that disclosed in the aforementioned patent application Ser. No. 12/914,072 of Miller.

In operation of the apparatus 101 to perform step 620, wastewater is pumped or is delivered from a storage tank (not shown) or lagoon 2 via gravity feed through conduit 102 to a first branch of a chemical injection mixing tee or port 104. Concurrently, soda ash solution (which may include some solid soda ash particles in slurry form) is delivered from at least one storage tank 106, or a plurality of tanks 106 through conduit 108 to the second branch of the chemical injection mixing port 104. The soda ash solution mixes with the wastewater at the mixing port 104.

An inline mixer 110 may be provided to enhance the mixing of the two liquid streams. The mixed streams are delivered through conduit 112 to a holding/treatment tank 114. In certain embodiments, when mixing the wastewater with the soda ash solution, the proportioning of the soda ash may be controlled by controlling the pH of the fluid to about 10.3 by the soda ash addition. A pH sensor in the tank 114 may be provided for this purpose.

Subsequent to the soda ash addition, a lime solution (which may include some solid lime particles in slurry form) is added to the soda ash-treated wastewater contained in tank 114. The soda ash-treated wastewater is delivered from tank 114 through conduit 118 to a first branch of a chemical injection mixing tee or port 120. Concurrently, a lime solution or slurry is delivered from at least one storage tank 122 through conduit 124 to the second branch of the chemical injection mixing port 120. The lime solution or slurry mixes with the soda ash-treated water at the mixing port 120. An inline mixer 126 may be provided to enhance the mixing of the two liquid streams. The mixed streams are delivered through conduit 128 to a holding/treatment tank 202 (FIG. 4).

In certain embodiments, the liquid stream exiting the injection port 120 may be divided into at least two separate streams, which may be directed through reaction tubes 130 and 132. The reaction tubes 130 and 132 may include in-line mixers 134 and 136. The Applicants have determined that utilization of reaction tubes with static in-line mixers enhance the intimate contact of the reactants, thereby accelerating the reaction and improving the chemical utilization efficiency.

In certain embodiments in which a lime slurry, i.e., a two phase liquid containing suspended solids, is delivered to the injection port 120, a recirculation conduit 138 back to tank 122 may be provided. In that manner, the flow rate of lime slurry in conduit 124 proximate to the injection port may be maintained at a high level, thereby maintaining a high shear rate in conduit 124, which prevents solid lime from settling out, thus delivering a homogeneous slurry to the injection port 120.

In certain embodiments, when mixing the soda ash-treated wastewater with the lime solution or slurry, the proportioning of the lime is controlled by controlling the pH of the fluid to about 10.6 by the lime addition. Through experimentation, the Applicants have discovered that optimum reduction of calcium and magnesium salts are achieved at the respective pH levels of 10.3 for soda ash addition and 10.6 for lime addition.

In treating the wastewater, the soda ash is introduced to precipitate soluble calcium bicarbonate to insoluble calcium carbonate, and the lime is added to precipitate soluble magnesium chloride to insoluble magnesium hydroxide. Other low concentrations of precipitatable salts are also achieved by the precipitation of carbonate (from soda ash) and hydroxide (from lime) ions such as iron, manganese, barium, strontium, etc.

The Applicants' method and apparatus is provided in particular to result in the precipitation of carbonate and hydroxide anions, which may be found in problematic concentrations in wastewater from oil and gas well drilling. This is accomplished through the completion of the precipitation reactions to a maximum percentage. In certain embodiments, with high concentrations of precipitatable salts, these precipitation reactions may require the utilization of one or more portable mixing tanks 150 (FIG. 2) as a reaction completion vessel, or a conduit in place of tank 150 for reaction completion. The Applicants have discovered that the volume of the reaction completion vessel 150 is important to the management of waste waters with large percentages of hardness salts. A volume which allows for up to at least four hours of residence time in vessel 150 for completion of the precipitation reactions with high concentrations of these salts may be required.

In the event that the wastewater contains high levels of barium and/or strontium, the Applicants' method and apparatus may include additional equipment and steps for removing a large proportion of such constituents. The Applicants apparatus and methods may include some or all of the equipment and steps of the aforementioned U.S. patent application Ser. No. 12/914,072 and Ser. No. 61/255,504 of Miller, which disclose a modular, portable and cost effective method and apparatus for treating well drilling wastewater for the removal of the barium and strontium salts onsite at the wellhead. In certain embodiments, the steps disclosed therein may be performed in advance of the steps of the instant process in the event that excessive levels of these heavy metals are present in the wastewater.

Referring to FIG. 4, and the flocculation chemical injection portion 200 of the Applicants' cold soda/lime softening subsystem 100 depicted therein, the liquid containing precipitated waste salts is delivered through at least one, and possibly multiple sequential flocculation chemical injection steps. In these steps 630 (FIG. 13), the precipitated salts are flocculated in preparation for separation from the liquid phase prior to subsequent ozone treatment and reverse osmosis steps that will be described subsequently. The flocculation chemical injection portion 200 of subsystem 100 may be provided on a flatbed trailer or in an enclosed trailer to render it transportable. The apparatus may be as disclosed in the aforementioned U.S. patent application Ser. No. 12/914,072 of Miller. It is to be understood that the order of the sequence of steps for the removal of precipitatable salts and ozone treatment and flocculation may vary from the order described herein, depending upon the level of solids and organic matter contamination in the fluid. High levels of solids may interfere with ozone treatment, in which case steps to reduce the amount of solids may be performed prior to ozone treatment. High levels of organic matter and/or solids may interfere with the softening steps, in which case steps to reduce the concentration of organic matter and/or the amount of solids may be performed prior to performing the cold lime softening.

In the embodiment depicted in FIG. 4, two flocculation chemical injection operations are depicted. The liquid containing precipitated waste salts is delivered from the reaction vessel 202 via conduit 204 to a first branch of a chemical injection mixing tee or port 206. Concurrently, a coagulant solution is delivered from at least one storage tank 208 through conduit 210 to the second branch of the chemical injection mixing port 206. The coagulant solution mixes with the liquid containing precipitated waste salts at the mixing port 206. An inline mixer 212 may be provided to enhance the mixing of the two liquid streams. The mixed streams are delivered through conduit 214 to a holding/treatment tank 216.

Subsequent to the coagulant addition, a flocculant solution is added to the coagulant-treated liquid contained in tank 216. The coagulant-treated liquid is delivered from tank 216 through conduit 218 to a first branch of a chemical injection mixing tee or port 220. Concurrently, a flocculant solution is delivered from at least one storage tank 222 through conduit 224 to the second branch of the chemical injection mixing port 220. The flocculant solution mixes with the coagulant-treated liquid at the mixing port 220. An inline mixer 226 may be provided to enhance the mixing of the two liquid streams. The mixed streams are delivered through conduit 228 to a filtration system 300 (FIG. 5).

In certain embodiments, the liquid stream exiting the injection port 220 may be divided into at least two separate streams, which may be directed through reaction tubes 230 and 232. The reaction tubes 230 and 232 may include in-line mixers 234 and 236. The Applicants have determined that the chemical efficiency and nature of the flocs produced by the instant process for many waste streams are superior in their ability to be separated from the supernatant liquid and dewatered when treated in this manner. The coagulant and flocculant reagents used in the flocculation chemical injection portion 200 may be as disclosed in the aforementioned U.S. patent application Ser. No. 12/914,072 of Miller. For example, the coagulant solution may include coagulant reagents such as aluminum chlorhydrate or other metal chlorides, and the flocculant solution may include flocculant reagents such as anionic poly acrylimides.

Referring now to FIG. 5, in step 640 (FIG. 13), the separation of the flocculated precipitated salts in the effluent stream from the flocculation chemical injection portion 200 is achieved by the filtration system 300. In certain embodiments, the filtration system 300 may be comprised of an active filter 302, wherein solids are captured on a filter medium, and then dewatered by the action of inflatable bladders disposed against the medium. One suitable active filter 302 is the "DryBox" filter manufactured and sold commercially by Innovative environmental Products, Inc. of Livonia, NY under license from Idee e Prodotti S.r.l. of Cavenago Brianza, Italy. The active filter 302 may be configured to be portable and sized as disclosed in the aforementioned U.S. patent application Ser. No. 12/914,072 of Miller.

The Applicants note that in conventional soda lime softening systems, the clarification stage is achieved in a specialized vessel, commonly referred to as a solids contactor such as that produced by WesTech Engineering Inc. of Ames Iowa, and multiple other similar equipment manufacturers. Solids contactor technology requires considerable space. The operation is dependent upon internal baffles, level controls and ancillary equipment such as mixers. The considerable space requirement associated with the solids contactor is due to the method of reaction and separation of the precipitated solids from the supernatant fluid. This requires three separate internal chambers for reaction, primary sedimentation and clarification. Furthermore the dewatering of the precipitated salts and the recovery of the water carrying the sludge of the precipitated salts away from the solids contactor are necessarily achieved in a separate dewatering and or filtration device.

In contrast, the active filter 302 achieves the clarification and dewatering of the precipitated salts within a single portable vessel along with the filtration of the fluid. In the active filter 302, the residence time required in conventional clarifiers for separation of the precipitated solids from the clarified, supernatant liquid are rendered unnecessary. There are no internal baffled chambers or requirements for sedimentation separation. The entire flow of the precipitated salts with the supernatant fluid pass into the active filter. Sedimentation of the precipitated salts occurs in the open box of the active filter which permits the supernatant fluid to pass out through the open portions of the active filter fabric and the entire mass of the solids are retained by the filter fabric within the active filter. Once sufficient mass of solids accumulate within the active filter, the fluid flow is diverted to a second active filter and the accumulated solids within the first active filter are dewatered using the active filtration action. The supernatant fluid from these dewatered solids is recovered along with the supernatant fluid from the open portions of the fabric collected as discussed above. Once sufficient supernatant fluid is removed from the accumulated solids in the initial active filter, additional flow of precipitated salts with the supernatant fluid may once again be passed into the active filter. This process is repeated multiple times until any active filter has accumulated sufficient solids mass to accommodate disposal. The active filter then becomes a disposal device.

The Applicants have determined that by maintaining particular physical and chemical parameters within one or more active filters 302, the clarification and dewatering process may be conducted in a semi-continuous manner, and without mixing tank 150. The Applicants have further determined the following operating parameters and/or equipment as being advantageous for the operation of active filter(s) 302: a pH of at least 10.1; hardness reduced to less than 250 ppm; the entrance of the influent via a floating boom (not shown) at one end of the active filter 302; the entrance velocity to the active filter 302 from this inlet boom maintained below 0.15 feet per second; a retention time within the active filter 302 of at least 60 minutes; the velocity of the solution within the active filter 302 of less than 0.00115 feet per second; and a skimming funnel positioned at the end of the active filter 302 opposite the floating influent boom.

The active filter 302 produces clarified effluent from the bottom outlet nozzles (not shown) in fluid communication with outlet conduits 303. The effluent passes through the filtration medium (not shown) in the active filter and from the skimming funnel.

Flocculated solids are retained by the filter medium of the active filter 302, and filtrate exits the active filter 302 via conduit 304 and via the skimming funnel (not shown) and discharge into the sump tank 308. The pH of the filtrate may be adjusted utilizing hydrochloric acid or other suitable acid (source not shown) in order to halt any residual precipitation and to adjust the pH down from an elevated level that is unsuitable for discharge from the process. The hydrochloric or other acid or carbon dioxide may be provided to an outlet sump box 308, which receives the filtrate after its discharge from the active filter 302.

Figure 8:
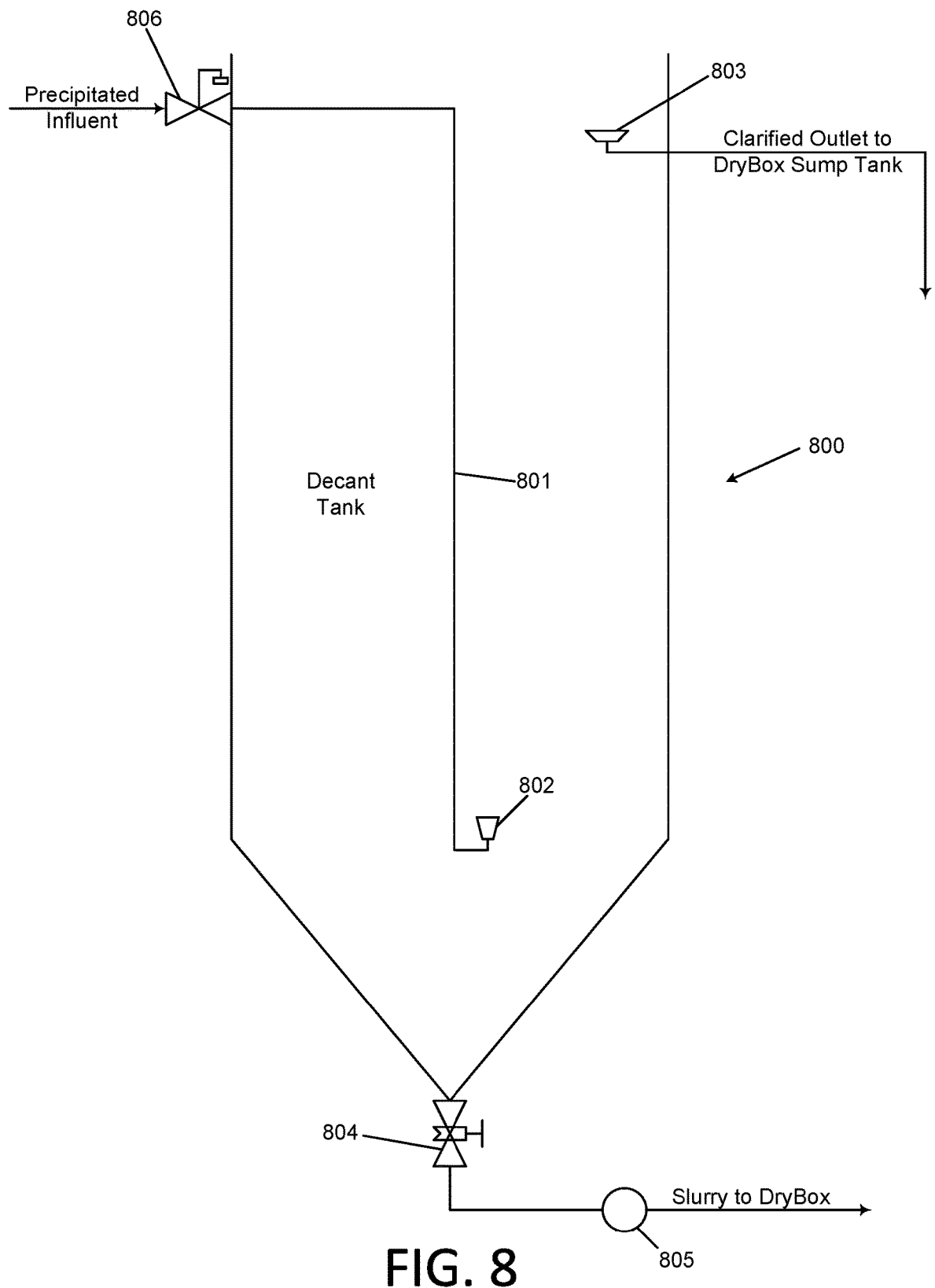
FIG. 8 is a schematic diagram of a precipitate decant tank.

In one embodiment, one or more conical bottom decanting tanks, such as those depicted in FIG. 8, may be utilized between the flocculent injection trailer 200 and the active filter 302 in lieu of or in addition to mixing tank 150. This decant tank may serve to optimize the space utilization of the active filter 302 by providing for separation of the precipitated salts from much of the solution external to the active filter 302 and allowing a slurry of higher concentration of precipitated salts to be the fed to the active filter 302. The Applicants have determined that construction of this decanting tank 800 and the operation thereof preferably have the following characteristics: a pH of at least 10.1; hardness reduced to less than 250 ppm; the entrance of the influent via a bottom upward oriented inlet pipe 801 positioned a minimum of one foot above the bottom of the tank 800; the entrance velocity to the decanting tank 800 from this inlet pipe maintained below 0.15 feet per second through the utilization of an inverted deceleration cone 802; a retention time within the decant tank of at least 60 minutes; the upward velocity of the solution within the decant tank of less than 0.00115 feet per second; and a skimming funnel 803 positioned at the upper portion of the decant tank 800.

Additionally, the bottom of the tank is preferably fitted with an outlet nozzle (not shown) of sufficient size to prevent bridging of the accumulating, settling precipitate across the nozzle. In certain embodiments, a nozzle 4 inches in diameter may be optimum. Additionally, an outlet valve 804 preferably has actuation which does not impart significant turbulence during its operation. In certain embodiments, a 4 inch diaphragm valve with slow actuation may be optimum. The valve 804 may be operated manually or automatically based upon sludge level sensing equipment (not shown) such as Turbimax Model CUS71D sensor manufactured by Endress & Hauser. The bottom sludge may be transferred via a suitable pump 805, such as a peristaltic or progressive cavity pump, to the inlet boom of the active filter 302. The active filter 302 produces clarified effluent from the bottom outlet nozzles (not shown) in fluid communication with outlet conduits 303. The effluent passes through the filtration medium (not shown) in the active filter and from the skimming funnel.

The clarified supernatant liquid passes through the skimming funnel and/or the outlet conduits 303 and is discharged into the sump tank 308 (FIG. 5). Influent to the tank may be controlled by a suitable automated level control device or a float valve 806. Unlike conventional solids contactor equipment and other systems utilizing only mix tanks and filters without a solids contactor, the vessel in FIG. 8 advantageously only requires flocculants in the small volume of sludge going to the dewatering system via outlet conduit 807 in order to achieve proper dewatering and filtration. Conventional solids contactor systems and other systems utilizing only mixing tanks and filters typically require addition of flocculants to the entire volume of water in order to achieve proper separation of the precipitated solids from the supernatant fluid within the contactor section and/or filter.

In one discovery made during pilot scale development work on the Applicants' wastewater treatment methods and apparatus, the Applicant were attempting to achieve a partial reduction of calcium hardness within the influent by utilizing a sub-stoichiometric quantity of sodium carbonate relative to the calcium concentration. The Applicants observed that upon achieving a pH of 10.1, the fluid emerging from the skimming funnel became free of any particulate and all of the particulate began to accumulate at the base of the vessel under minimum up flow conditions. Under long accepted operating parameters for soda softening a minimum pH of 10.3 has been established for operation of conventional systems. In addition, conventional systems include the requirement for flocculating agents to enhance the sedimentation of the particulate in a sedimentation zone. This sub-stoichiometric sedimentation at a pH below 10.3 was an unexpected result, as was the sedimentation of the entrained solid particles in the absence of flocculating agents.

Referring again to FIGS. 3 and 4, in the event that the wastewater from lagoon 2 does not require hardness reduction of the high extent achievable by the cold soda/lime softening chemical injection portion 101 of the cold soda/lime softening subsystem 100, then a calculated portion of the wastewater may be diverted through a bypass configuration (not shown) and metered into and blended with the soft water at the outlet of the reaction vessel 202, prior to the flocculation process performed using flocculation chemical injection portion 200 of the subsystem 100. Any particulate and other coagulatable and flocculatable contaminants in the bypass stream will be removed through this process. The resultant effluent from this combined subsystem process will meet hardness requirements for the subsequent reverse osmosis process while minimizing processing costs and hydraulic loading on the softening system.

Figure 9:
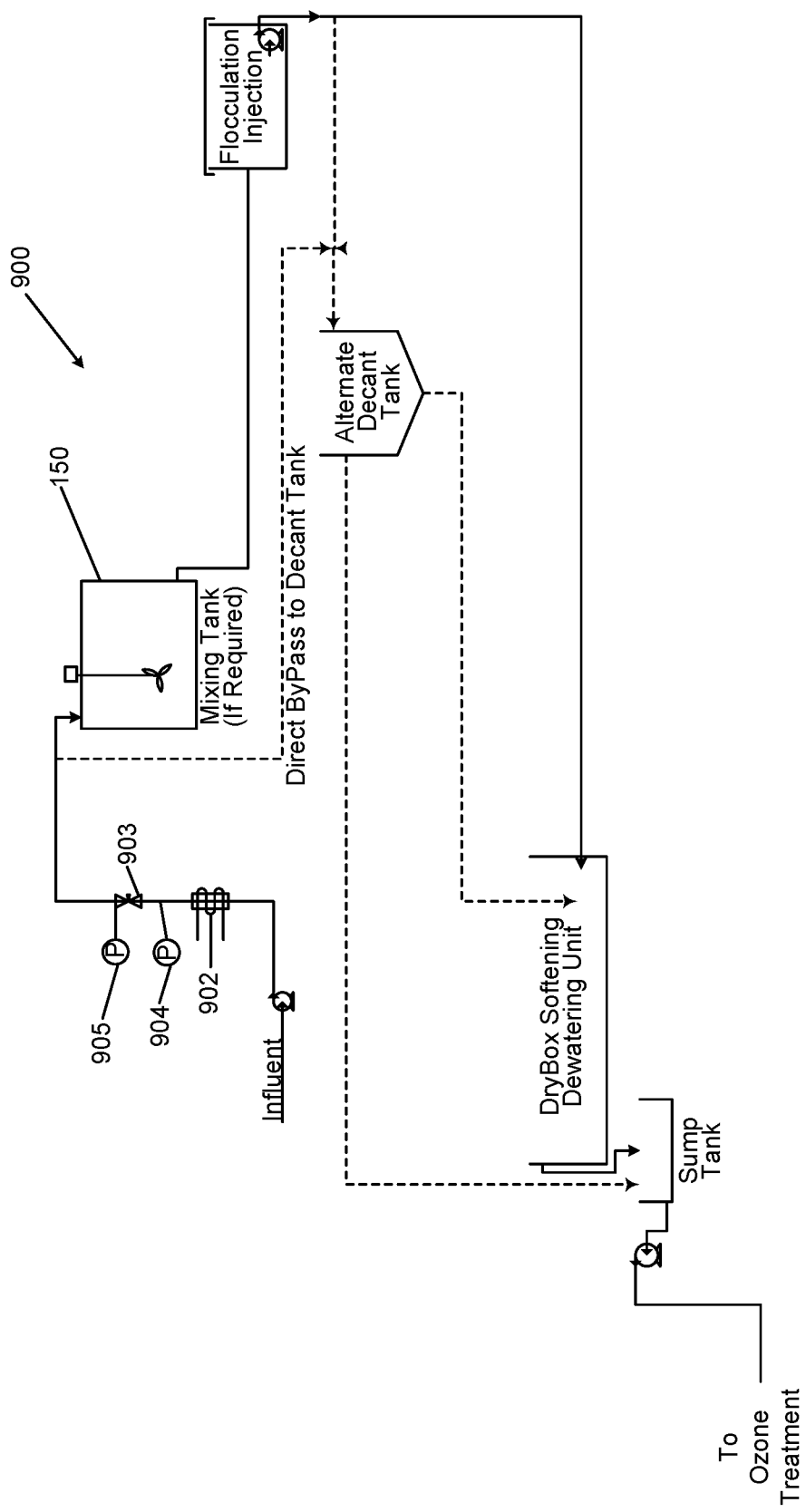
FIG. 9 is a schematic diagram of an alternative softening subsystem portion of the Applicants' apparatus of FIG. 1.

FIG. 9 is a schematic diagram of an alternative softening subsystem portion of the Applicants' apparatus of FIG. 1, which utilizes electrical currents induced into the solution to enhance anion and cation excitation and resultant attraction. In this alternative embodiment, the cold soda lime softening subsystem 101 of FIG. 3 that is used to perform step 620 (FIG. 13) is substituted with a subsystem 900 for performing step 650, the subsystem 900 inducing a specific electric field within the connective fluids in the process piping and tanks. The presence of this field enhances the attraction of the cations and anions to each other, thereby enhancing flocculation and subsequent filtration of flocs from the waste water.

Referring to FIG. 9, the Applicant's subsystem 900 is comprised of a field induction unit 902, a variable orifice 903, pressure sensors 904 and 905 and differential pressure instrumentation (not shown). The field induction unit 902 induces an electric current into the solution within an aqueous system of pipes and tanks. This current excites the cations and anions. These excited anions and cations contact each other to form clusters. Upon achieving a saturation condition relative to the dissolved salts in the solution, the charged particles will form seed crystals. The seed crystals will provide a location for precipitation of like hardness clusters to form larger crystals which may then be separated from the aqueous solution. In one embodiment, a HydroFLOW Model120i electronic water treatment device as provided by HydroFlow USA of Redmond, Washington may be used as the field induction unit 902.

In the Applicants' subsystem 900, the saturation condition is produced by passage of the solution through an orifice of a throttling valve 903. This produces a significant low pressure condition at the valve outlet at which saturation occurs. Seed crystals form at this location. These seed crystals propagate throughout the aqueous system in which the electric current is being induced and excited ions are available. These excited ions precipitate the hardness salts onto the seed crystals and the crystals grow to sufficient size to be separated from the solution.

Referring again to FIG. 9 the pressure drop across the orifice of valve 903 is measured at pressure gauges or sensors 904 and 905. The optimum pressure drop for a given concentration of carbonate, hydroxide, and/or sulfate ions is determined by observation. Once the optimum pressure drop is determined, the orifice size of throttling valve 903 is fixed (made constant) and the differential pressure instruments 904 and 905 monitor the pressure drop to ensure satisfactory operation.

The reaction tank 150 in FIG. 2 is also the reaction tank 150 for this embodiment, in which the completion of the precipitation of the hardness is achieved. The overall waste water treatment process proceeds identically from that point as in the case where the cold soda lime softening of FIG. 3 is used.

Given appropriately low hardness conditions, the clarification of the precipitated solution obtained from the electric field induced precipitation 650 may be achieved without the utilization of a coagulant and flocculent in the solution. The Applicants have observed these conditions at hardness levels below 300 ppm. In this case, the decant tank 800 of FIG. 8 may be positioned before the flocculent injection system 200 of FIG. 4 and in place of the mixing tank 150, and only the concentrated slurry from the bottom of the decant tank 800 requires chemical treatment prior to its entry into the active filter 302. The 300 ppm value is not intended to be a limiting factor for this application, but rather an observation made during experimental trials.

Without wishing to be bound to any particular theory, the Applicants believe that the electric field induced precipitation 650 utilizes naturally occurring bicarbonate ions in solution in surface and other similar water supplies in order to produce crystals of calcium carbonate which are removed by the process. Initially, when performing field experiments in electric field induced precipitation, no precipitation was achieved. In reviewing the water analysis of exemplary samples of waste hydro-fracturing water, the Applicants discovered that there was an absence of any carbonate in the water samples. Instead, the calcium hardness was present as the cation associated with some of the chloride ions in the water. Therefore there was nothing present with which calcium would precipitate as a result of the induced current and pressure drop. The Applicants have discovered that it is necessary to add sufficient carbonate ions to the hydro-fracturing water solution in order to precipitate the calcium. In certain embodiments, this may be done via the addition of sodium carbonate in a manner similar to soda lime softening.

A unique benefit of electric field induced precipitation is that the residual calcium in the hydro-fracturing water may be customized by adjusting the quantity of sodium carbonate added in order to remove only the amount of calcium necessary. Some downstream operation and softening operations do not require removal of significant percentages of the calcium. This would represent a cost savings and a simplification of the soda lime softening process. The process would not be dependent upon tight pH control as with conventional systems, as well as with the upflow vessel system 800 in this application. In addition, the above-referenced pH requirements will typically require more soda ash than is necessary for a customized level of calcium in the effluent from the softening system, which results in a cost reduction associated with the lower quantity of sodium carbonate.

In another embodiment of the Applicants' method, the concentration of the hardness precipitating anions, carbonate and hydroxide, may be sufficiently low as to not require softening. In such cases, the utilization of the softening chemical injection subsystem 101 of FIG. 3 may be modified to inject hydrochloric acid in place of soda ash to lower the pH of the influent to a level of approximately 5. In this manner, the carbonate ions will be converted to water and carbon dioxide gas and the hydroxide ions will be converted to water and soluble sodium chloride salt. It will be necessary to vent tank 114 in this instance in order to discharge the carbon dioxide gas outside of the trailer containing the tank 114. Additionally, the calcium hydroxide injection portion of the 101 subsystem would be idle and empty. The effluent from this process may be discharged directly to sump tank 308 of the filtration system 300 in FIG. 5, from where it will proceed as indicated below through a polishing filter and on to the ozone treatment stage.

Referring again to FIG. 5, the filtrate in conduit 304 and/or sump tank 308 may be delivered via conduit 310 to a "polishing" filter 312 to remove any small amount of remaining solid particles. The filtrate may then be delivered via conduit 314 to a storage tank 316, or the filtrate may be delivered directly to an ozone treatment subsystem 400 of FIG. 6.

Referring to FIG. 6, the filtrate may be treated with ozone and hydrogen peroxide or any other ozone catalyst in an advanced oxidation process 660 (FIG. 13). In this process, residual organic matter in the filtrate is oxidized to water and carbon dioxide and most of the trace metal ions such as iron and manganese are oxidized to their precipitated oxide form. The filtrate is delivered from the active filter 302 (FIG. 5) or from storage tank 316 through conduit 402 to injection port 404. Concurrently, ozone is delivered from an ozone generator 406 including oxygen source 407, through conduit 408 to injection port 404. The ozone mixes with the filtrate at the mixing port 404. An inline mixer 410 may be provided to enhance the mixing of the ozone with the filtrate. The ozonated filtrate may be delivered through conduit 412 to a holding tank 414, or directly to the reverse osmosis subsystem 500 of FIG. 7. The Applicants' have found that some waste waters can be treated with simple oxidation, without utilization of the advanced oxidation processes.

The ozonation treatment requirements are dependent upon the presence of certain constituents and/or concentrations in the filtrate, including but not limited to metals, bacteria, hydrogen sulfide, hydrocarbons, total organic content, and biochemical oxygen demand, as well as temperature and pH. With the exception of the pH, all of the constituents may be accommodated by adjustments to the Applicants' ozonation process. During the ozonation process, the pH level of the filtrate is preferred to be between 3 and 10. Under conditions found in the majority of waste water streams found in the oil and gas industry, the ozone treatment will be in the range of 10 ppm to 50 ppm concentration in the waste water with a dwell time of a few seconds up to the length of time the waste water is in holding tanks, during which time the ozone slowly reverts back to dissolved oxygen in the water. Elevated level of hydrocarbons of more than 50 milligrams per liter, and BOD levels in excess of 500 would likely require the oxidation/contact chamber to be pressurized and the dwell time extended. The required pressure would be in the range of 1 to 5 psi and the dwell time of a few seconds up to an hour.

The Applicants have discovered that the size of ozone bubbles needed to accomplish complete oxidation of organic contaminants in the filtrate can be highly important, and that relying on diffusion of ozone gas into the filtrate from coarse bubbles, or a large free surface is insufficient for treatment of highly contaminated waste waters such as pit water. Instead, the Applicants have found that the use of microbubbles with a diameter of between about 5 and 500 microns delivered through a venturi contact system is sufficient for treatment of most filtrates. However, when the filtrate from active filter 302 contains elevated levels of contamination above 50 mg/l hydrocarbons, above 250 mg/l total organic content, and/or above 500 mg/l biochemical oxygen demand, then successful ozonation of the filtrate requires the infusion of nanobubbles with a diameter of $10^{-6}$ meters to $10^{-9}$ meters delivered at a similar pressure and residence time as previously shown for microbubbles. The concentration of ozone in the ozone/oxygen gas should be the highest percent by weight available from the ozone generator 406, and preferably in the range of at least 6% to 10% in order to optimize the efficiency of the ozonation operation.

At the exit of the ozone oxidation process, the ozonated filtrate may be passed through a bed 416 of activated carbon.

The activated carbon removes the ozone from the filtrate. This is desirable, since residual ozone in the filtrate may damage the membranes of the reverse osmosis (RO) subsystem 500. The activated carbon also removes any residual trace organic materials to further mitigate organic fouling of the RO membranes.

Following full scale operation of the apparatus and subsequent evaluations, the Applicants have determined that the ozone may also be destroyed by utilization of ultraviolet (UV) light. Utilization of UV light for destruction of ozone has been well accepted practice and well documented in literature.

During full scale operations of the apparatus, the Applicants determined a method for destruction of the ozone by elevating the pH above 10.0 and subsequently lowering the pH back to a level appropriate for influent into a reverse osmosis (RO) system. The elevation of the pH utilizing sodium hydroxide also produces a precipitate of hydroxide salts which are formed with residual, non-calcium cations in the clarified water. These precipitates were removed by polish filtration prior lowering the pH for delivery to the RO system.

Referring to FIG. 7, in step 680 (FIG. 13), the filtrate may then be further filtered through micron or submicron filtration media 418 to protect the RO membranes from particulate fouling. The filtrate is then introduced into the inlet of the RO system 500 via conduit 502. In the embodiment depicted in FIG. 7, the RO system includes a multi stage reverse osmosis process. Depending on the total dissolved solids (TDS) concentration of the incoming filtrate stream and the effluent stream requirements, the multistage configuration may be serial or may be comprised of a split stream configuration. In each case the process includes an influent bypass configuration to accommodate customized effluent TDS requirements.

In the embodiment of the RO subsystem having a serial configuration, which is the embodiment depicted in FIG. 7, the ozonated filtrate is introduced into a first reverse osmosis stage in reverse osmosis unit 510 at pressures in the range of 200 to 300 psi. Other embodiments including split stream and concentrate recycle have also been developed. The series configuration is provided herein for simplicity.

A booster pump 504 may be used to increase the feed pressure in RO supply conduit 506 to RO unit 510. The permeate from RO unit 510 is discharged via conduit 512 at a TDS concentration in the range of 10 to 150, and may be delivered to a permeate reception tank 514. The concentrate from RO unit 510 is discharged via conduit 516, and is then delivered via pump 522, booster pump 524, and conduit 526 to a second reverse osmosis stage in reverse osmosis unit 530 at pressures in the range of 350 to 450 psi. The concentrate from the first stage is at a TDS concentration of about 10,000 to 15,000 ppm. The permeate from RO unit 530 is discharged via conduit 532 at a TDS concentration in the range of 200 to 300 ppm, and may also be delivered to the permeate reception tank 514. The concentrate from the second stage is at a TDS concentration of about 25,000 to 35,000 ppm. The permeate effluent discharged to permeate reception tank 514 is a "product" of the Applicants' apparatus and method, and is water sufficiently treated as to be suitable for its intended reuse or disposition. The concentrate from RO unit 530 is discharged via conduit 534 to a concentrate reception tank 536, and may subsequently be transferred via conduit 538 to a wastewater storage tank 540. The overall recovery rate of influent through this configuration is approximately 80% to 85%.

In the event that the requirements for purity of the final effluent from the apparatus 10 do not mandate a TDS level at the high level achievable by the RO subsystem 500, then a calculated portion of the ozonated filtrate may be diverted through a bypass conduit 503 and be metered into and blended with the low TDS RO permeate from RO units 510 and 530 to satisfy the effluent requirements. This is beneficial in two regards. Firstly, if the effluent requirements are flexible and not limited to a very low level of TDS, then a bypass configuration would allow for less hydraulic loading on the RO system 500 and achieve a reduction in operating horse power and other accumulating costs by blending the effluent up to a maximum allowable TDS level. Secondly, if the effluent from the RO system 500 is intended for a reuse as a drilling brine, for example, the specific gravity of the brine may be customized through the blending of the high quality RO effluent with the bypassed high TDS of the ozonated filtrate to the TDS concentration associated with the desired brine specific gravity. The overall recovery rate of influent through this configuration is approximately 80% to 85%.

In the event that the system influent to the membranes has an elevated temperature in excess of 120° F., the RO membranes in RO units 510 and 530 must be suitable to accommodate the elevated temperatures and pressures while maintaining the ionic material removal performance. Without being limited to any particular component, the Applicants have determined that the RO membranes of model CPAS-LD-HT RO unit manufactured and sold by Hydranautics, Inc. of Oceanside, California meet this requirement. This membrane is a composite polyamide spiral wound cartridge membrane with a high temperature inner cartridge spacer. The unique manufacturing process conditions the polyamide fibers in such a manner that they do not lose their structural integrity during thermal cycling of the equipment throughout the useful life, thereby maintaining the salt rejection performance at elevated temperatures.

With the above RO membranes, or suitable equivalent membranes from other manufacturers, the Applicants' RO subsystem 500 will operate at sustained temperatures up to 158° F., with peak instantaneous temperatures up to 176° F., with performance as defined above. If necessary for the product water's utilization, the elevated temperature is maintained throughout the process at a maximum level through passive means by utilization of appropriate, commercially available insulation and piping and process equipment construction materials.

Figure 10:
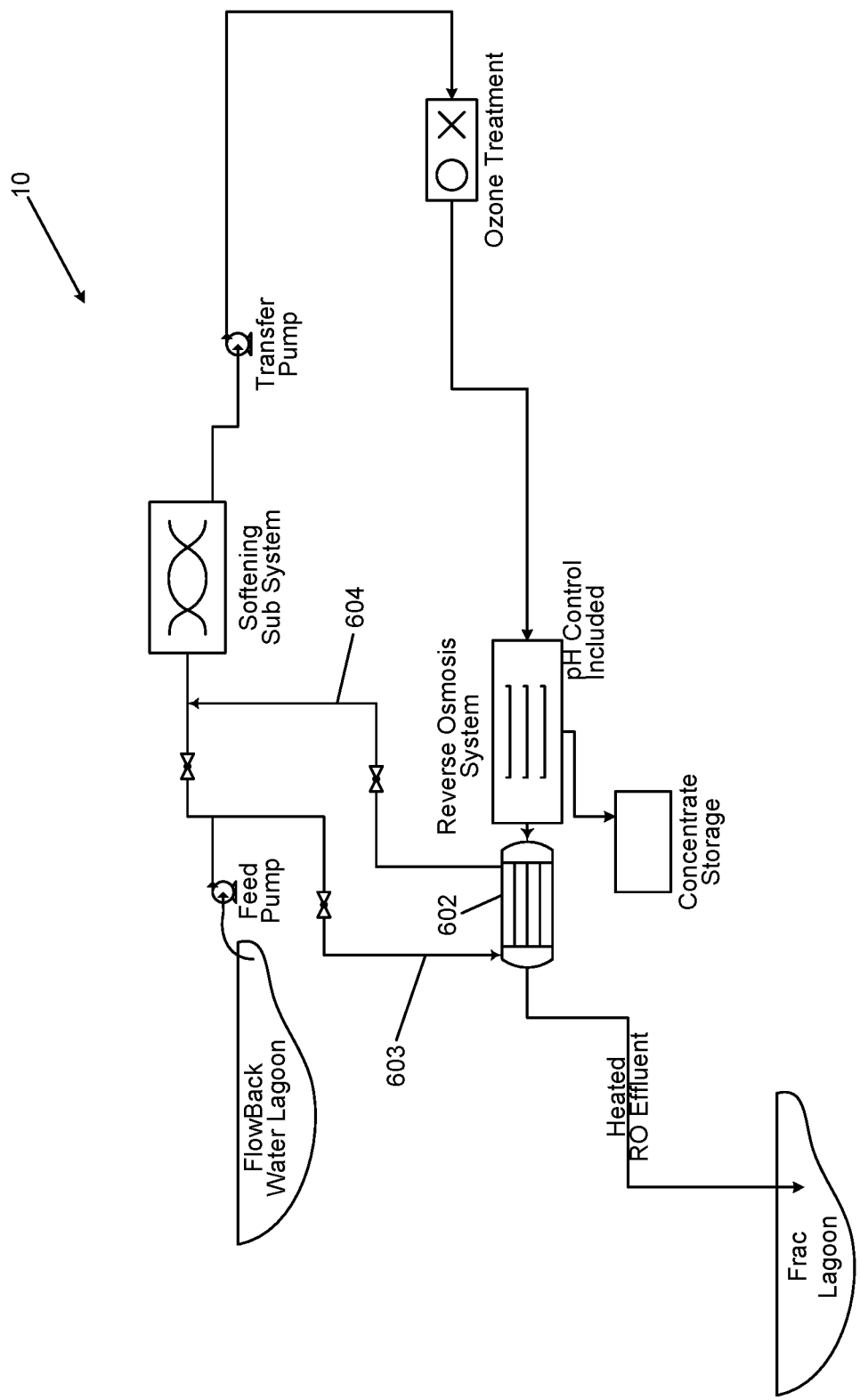
FIG. 10 is a schematic diagram of a heat exchanger system for use with high temperature influent sources.

FIG. 10 is a schematic diagram of a heat exchanger system for use with high temperature influent sources. Referring to FIG. 10, in order to provide for the maximum outlet temperature from the overall process 10 for its reuse, when required, the treated effluent from the instant process is passed through a heat exchanger 602 which runs counter current to the influent to the process through conduits 603 and 604. The influent temperature from typical elevated temperature sources is in the range of 180° F. Utilization of an appropriate, commercially available heat exchanger would provide for effluent temperatures in the range of 170° F. to 175° F.

In certain embodiments, boron may be a constituent of the waste water, which must be removed. Common sea water reverse osmosis membranes are suitable for removing boron from influent waters up to certain levels under proposed conditions. However, conditions exist in certain formations in which the source water and or the flowback water have elevated levels of boron which may not be fully separated from the influent stream in the proposed membrane configuration and operating conditions, thereby allowing undesirable levels of boron to pass into the permeate. In order to optimize the removal of boron in reverse osmosis membranes, the pH of the influent must be in the range of 10 to 10.5.

In order to achieve optimum operation of the membranes for removal of the other constituents anticipated in the influent, a pH in the range of 3 to 6 may be utilized. Elevating the pH to 10 will require utilization of sodium carbonate and or calcium hydroxide and/or sodium hydroxide. If the pH is elevated in this manner in the presence of the other constituents of concern, calcium, magnesium, etc. precipitates will form in the reverse osmosis membranes. Through experimentation, the Applicants have determined that in order to optimize removal of elevated levels of boron, the reverse osmosis influent must be treated as indicated to a pH level of 3 to 6, and the permeate allowed to accumulate with TDS reduced to a minimum level, while allowing what may be an undesirable level of boron to accumulate in the permeate. This permeate with the elevated level of boron, but absent the precipitate forming cations, may then be pH adjusted to the desired level of 10 to 10.5 and passed through a separate but similar sea water RO membrane array or accumulated and passed back through the initial RO membrane array following completion of treatment of the initial influent. In this embodiment, the softening chemical injection trailer, or a similarly configured subsystem 200, may be utilized to elevate the pH. In such cases the utilization of the softening chemical injection subsystem 200 may be modified to inject sodium hydroxide in place of soda ash to raise the pH of the influent to a level of 10 to 10.5. The effluent from this process step may then be directed to RO feed storage tank 414 of FIG. 6 and treated as indicated above.

The concentrate produced from the reverse osmosis treatment of boron may have levels of boron which pose a problem for cost effective disposal. To accommodate such cases, the Applicants have developed a chemical precipitation subsystem which will remove a significant portion of the boron from the concentrate stream and concentrate the boron into a dewatered sludge cake.

Referring to FIG. 13, the subsystem and associated boron removal method 690 is comprised of an acidification stage 692, a magnesium chloride addition stage 694, an alkalization/precipitation stage 696 and a filtration stage 698. The instant subsystem/process 690 is intended to achieve co-precipitation of boron hydroxide and magnesium hydroxide and adsorption of boron hydroxide within the magnesium hydroxide precipitate clusters.

Through experimentation acidification to pH of 3.5 to 4.0 has been determined to be an optimum initial pH which ensures complete dissolution of the magnesium chloride required to achieve optimum co-precipitation and adsorption in the apparatus 10. The pH of 10.9 to 11.5 in a mixing/retention/reaction tank was determined to ensure optimum co-precipitation and adsorption in the apparatus 10.

Figure 11:
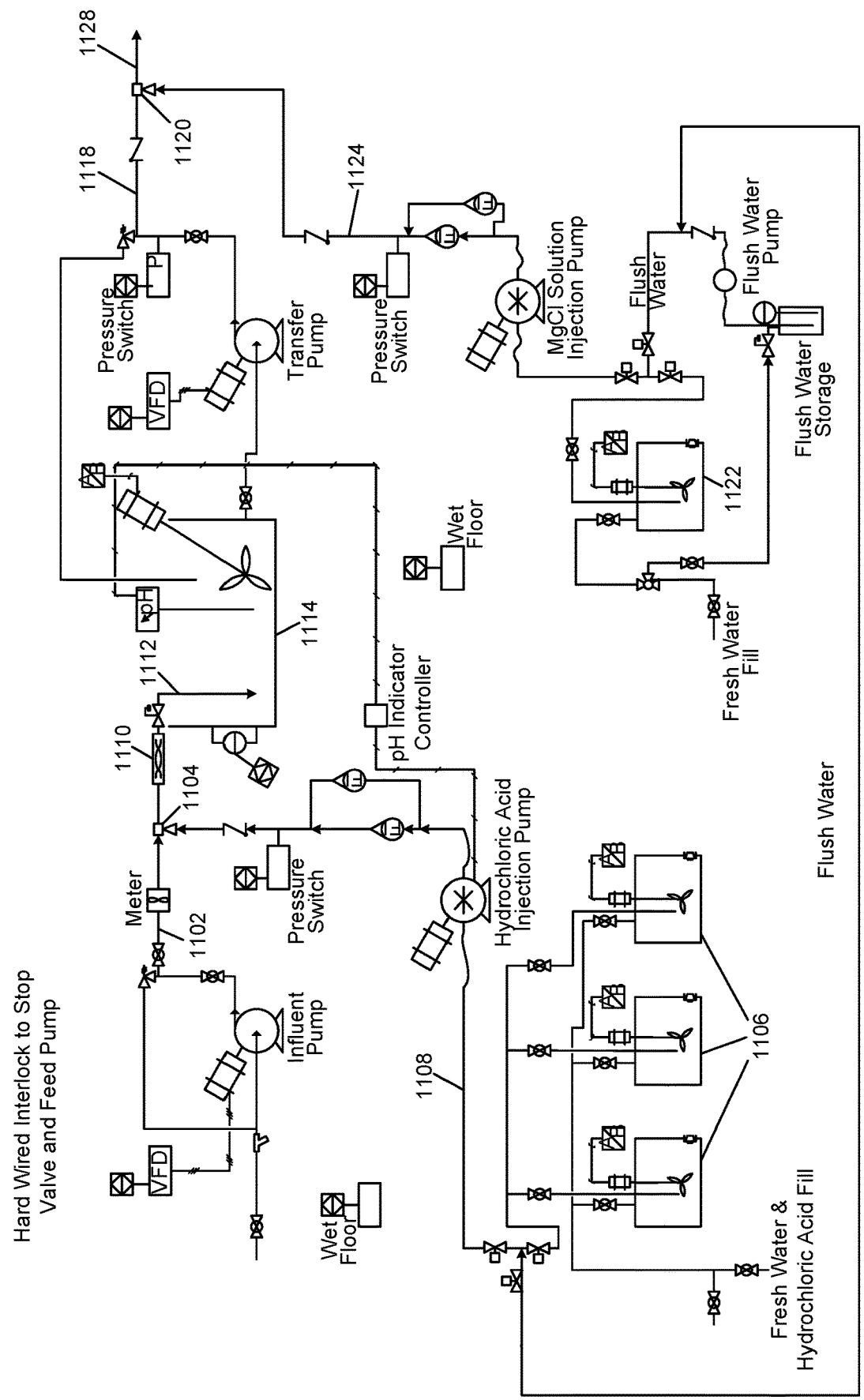
FIG. 11 and FIG. 12 are schematic diagrams associated with the removal of elevated concentrations of boron from reverse osmosis concentrate.
Figure 12:
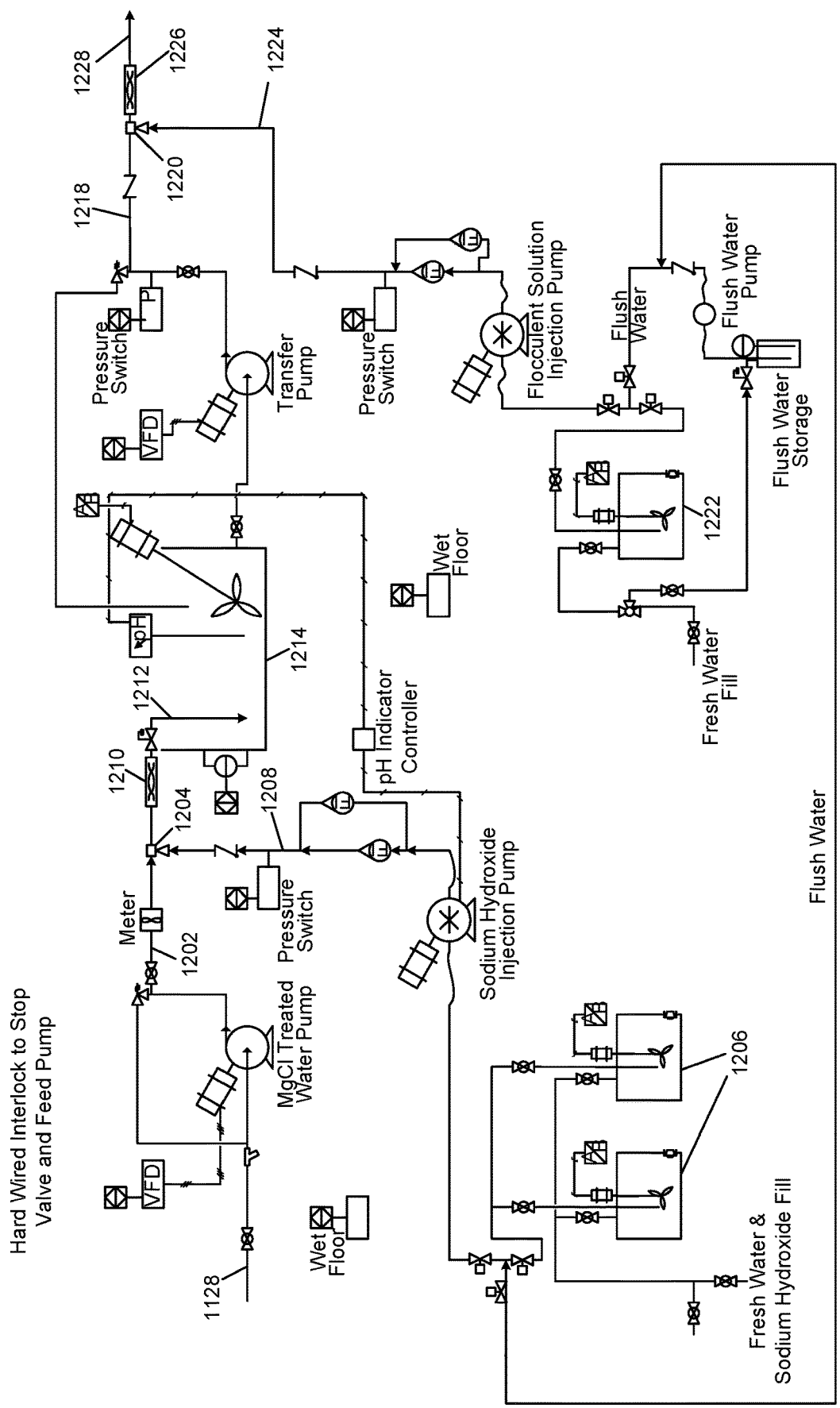

FIG. 11 and FIG. 12 are schematic diagrams associated with the removal of elevated concentrations of boron from reverse osmosis concentrate produced by the system 10. Referring to FIGS. 11 and 12, the boron precipitation system is comprised of a hydrochloric acid injection stage for step 692, a magnesium chloride injection stage for step 694, a sodium hydroxide injection stage and a flocculation chemical injection stage for step 696, and a filtration system stage for step 698.

In operation of the apparatus hydrochloric acid stage, wastewater is pumped or is delivered from a storage tank (not shown) through conduit 1102 to a first branch of a chemical injection mixing tee or port 1104. Concurrently, hydrochloric acid solution is delivered from at least one storage tank 1106, or a plurality of tanks 1106 through conduit 1108 to the second branch of the chemical injection mixing port 1104. The hydrochloric acid solution mixes with the wastewater at the mixing port 1104.

An inline mixer 1110 may be provided to enhance the mixing of the two liquid streams. The mixed streams are delivered through conduit 1112 to a holding/treatment tank 1114. In certain embodiments, when mixing the wastewater with the hydrochloric acid solution, the proportioning of the hydrochloric acid may be controlled by controlling the pH of the fluid to about 2.7 to 3.0 by the hydrochloric acid addition. A pH sensor in the tank 1114 may be provided for this purpose.

Subsequent to the hydrochloric acid addition, a magnesium chloride solution is added to the hydrochloric acid-treated wastewater contained in tank 1114 to a total concentration of approximately 0.2%. This concentration includes any magnesium chloride contained within the concentrate produced by the preceding reverse osmosis process. The hydrochloric acid-treated wastewater is delivered from tank 1114 through conduit 1118 to a first branch of a chemical injection mixing tee or port 1120. Concurrently, a magnesium chloride solution is delivered from at least one storage tank 1122 through conduit 1124 to the second branch of the chemical injection mixing port 1120. The magnesium chloride solution mixes with the hydrochloric acid-treated water at the mixing port 1120. An inline mixer (not shown) may be provided to enhance the mixing of the two liquid streams. The mixed streams are delivered through conduit 1128 to an alkalization stage.

Subsequent to the magnesium chloride addition a sodium hydroxide solution is added to the magnesium chloride treated water. Referring to FIG. 12, in the operation of this stage, magnesium chloride treated water is pumped or is delivered through conduit 1202 to a first branch of a chemical injection mixing tee or port 1204. Concurrently, sodium hydroxide solution is delivered from at least one storage tank 1206, or a plurality of tanks 1206 through conduit 1208 to the second branch of the chemical injection mixing port 1204. The sodium hydroxide solution mixes with the wastewater at the mixing port 1204.

An inline mixer 1210 may be provided to enhance the mixing of the two liquid streams. The mixed streams are delivered through conduit 1212 to a holding/treatment tank 1214. In certain embodiments, when mixing the magnesium chloride treated water with the sodium hydroxide solution, the proportioning of the sodium hydroxide solution may be controlled by controlling the pH of the fluid to about 11.9 to 12.0 by the sodium hydroxide addition. A pH sensor in the tank 1214 may be provided for this purpose. An additional pH sensor at the outlet of tank 1214 may provide additional feedback as to the actual finished reaction pH. The residence time in tank 1214 is preferably at least 5 minutes.

Referring again to FIG. 12 and the flocculation chemical injection stage of the Applicants' boron precipitation system depicted therein, the liquid containing precipitated waste salts is delivered through at least one, and possibly multiple sequential flocculation chemical injection steps. In these steps, the precipitated salts are flocculated in preparation for separation from the liquid phase prior to disposal or recycling. The flocculation chemical injection portion may be provided on a flatbed trailer or in an enclosed trailer to render it transportable. The apparatus may be as disclosed in the aforementioned U.S. patent application Ser. No. 12/914, 072 of Miller.

In the embodiment depicted in FIG. 12, a single flocculation chemical injection operation is depicted. The liquid containing precipitated waste salts is delivered from tank 1214 via conduit 1218 to a first branch of a chemical injection mixing tee or port 1220. Concurrently, a flocculant solution is delivered from at least one storage tank 1222 through conduit 1224 to the second branch of the chemical injection mixing port 1220. The flocculant solution mixes with the coagulant-treated liquid at the mixing port 1220. An inline mixer 1226 may be provided to enhance the mixing of the two liquid streams. The mixed streams are delivered through conduit 1228 to a filtration system 300 (FIG. 5).

In certain embodiments, the liquid stream exiting the injection port 1220 may be divided into at least two separate streams, which may be directed through reaction tubes (not shown). The reaction tubes may include in-line mixers. The Applicants have determined that the chemical efficiency and nature of the flocs produced by the instant process are superior in their ability to be separated from the supernatant liquid and dewatered when treated in this manner.

An optimum flocculent reagent used in the flocculation chemical injection portion 200 has been determined to be Sedifloc 7073 as provided by 3F Chemica Americas of Aberdeen, Missouri. An optimum concentration of this flocculent is in the range of 30 to 50 PPM in the solution when delivered in a dilute aqueous solution.

Referring now to FIG. 5, the separation of the flocculated precipitated salts in the effluent stream from the flocculation chemical injection stage is achieved by the filtration system 300. In certain embodiments, the filtration system 300 may be comprised of an active filter 302, wherein solids are captured on a filter medium, and then dewatered by the action of inflatable bladders disposed against the medium. One suitable active filter 302 is the "DryBox" filter manufactured and sold commercially by Innovative environmental Products, Inc. of Livonia, NY under license from Idee e Prodotti S.r.l. of Cavenago Brianza, Italy. The active filter 302 may be configured to be portable and sized as disclosed in the aforementioned U.S. patent application Ser. No. 12/914,072 of Miller.

The pH of clarified water must then be adjusted to a level less than 10 for disposal. This may be completed with sump tank 308, FIG. 7, as discussed above. The clarified water may be transferred to suitable storage for reuse appropriate disposition. Appropriate disposition may include blending with process influent water at an appropriate stage, provided that the boron level of this clarified water is similar to the water intended for blending with.

The Applicants have developed a control system for the overall apparatus 10, which is a customized and integrated system that incorporates unique algorithms which evaluate the chemical characteristics of the wastewater as determined by in line analytical instrumentation, and adjust certain operating parameters of the process and apparatus to meet intermediate process parameters as well as final effluent purity requirements. The control system includes a programmable logic controller (PLC), or other suitable industrial computer/processor.

Total dissolved solids, pH, total suspended solids, heavy metals concentrations, organic contamination concentrations and species, and calcium and alkalinity of the influent wastewater and of the processed liquid at various points during processing are determined by instrumentation and communicated to the PLC.

The requirements of the influent to the RO system 500 and the overall process effluent requirements are programmed into the PLC by the operator. The calcium and hardness influent data is evaluated against the RO influent requirements. The control system algorithms in the PLC or other computer, which are based upon chemical stoichiometry, utilize this data to calculate, anticipate and set feed conditions and inventory requirements for soda ash and lime in the softening process. In addition, softener feed bypass ratios, if applicable, are calculated as well. Calcium and alkalinity instrumentation (not shown) may be utilized at the inlet and outlet of the softening system (FIG. 4). These instruments provide feedback information used by the control system to further adjust the feed conditions of the soda ash and lime in the cold soda/lime softening chemical injection portion 101 of the apparatus 10.

The algorithms in turn calculate the quantity of precipitated salts which will be produced by the softening process performed by subsystem 100 of the apparatus 10. The fluid flow rate and calculated quantity of precipitated solids plus the measured suspended solids present in the influent wastewater are utilized by the algorithms to calculate, anticipate and set feed conditions and inventory requirements for coagulants and flocculants in the flocculation process performed by the flocculation chemical injection portion 200 of the apparatus 10.

At the inlet to the dewatering and filtration active filter 302, optical comparative instrumentation (not shown) may be provided which detects flocculant size, thereby enabling production of an optimum flocculated slurry. At the filtrate outlet(s) 303 of the active filter 302, instrumentation (not shown) may be included to determine turbidity by direct in-line analysis and/or by analysis of pressure drop anomalies in the effluent polishing filter 312. These instruments provide feedback information used by the control system to further adjust the feed conditions of the coagulant and/or flocculants in the flocculation chemical injection portion 200.

The effluent from the active filter 302 may be evaluated by in-line instrumentation (not shown) for residual organic matter. This data may be utilized by the control system algorithms, which may be based upon historical system performance on organic contamination, in order to anticipate and set the operating conditions of the ozonation subsystem 400. Residual ozone and residual organic matter analysis instrumentation may be included in the outlet conduit 412 of the ozonation subsystem 400. These instruments provide feedback information to the control system to further adjust the operation of the ozonation subsystem 400.

In addition, secondary residual ozone and residual organic matter instrumentation (not shown) may be included at the outlet of the carbon filter 416 to provide alarm annunciation and automated responses to instances of unacceptable levels of residual ozone and/or organic matter in the ozonated filtrate delivered to the RO subsystem 500.

Within the RO subsystem 500, multistage configuration pre-stage and interstage pressure instrumentation (not shown) may be included. In addition, RO feed conductivity instrumentation (not shown) may be included. Control system algorithms, which are based upon historical and calculated performance data on the membranes of the RO units 510 and 530, may utilize the RO feed conductivity data and softening subsystem effluent calcium and alkalinity levels, to anticipate and set the operating conditions of the RO subsystem 500. The process is then controlled by utilizing the pressure data to optimize operation of the RO subsystem 500. The effluent (permeate) of the RO subsystem 500 may be evaluated by secondary conductivity instrumentation (not shown). This instrumentation provides feedback information to the control system to further adjust the operation of the RO process and subsystem 500. In addition, the instrumentation may be utilized to provide alarm annunciation of and automated responses to instances of RO permeate effluent which is not within specifications.

In addition to the process control architecture for this overall process an integrated human health and environmental safety control system may also be included.

In one aspect of the health and environmental safety control system, initial wastewater influent from the lagoon 2 (FIG. 1) or storage tanks (not shown) may be continuously monitored for hydrogen sulfide gas contamination as well as for the presence of absorbed and/or entrained combustible gases or fluids and for carbon dioxide gas. If the instrumentation detects the presence of these materials the influent wastewater, an alarm condition will be annunciated and a process exhaust fan will be turned on to evacuate that process space. Also, the supply of the influent wastewater is immediately interrupted and the control system initiates a programmed, sequential shutdown of the entire process.

All process influent and effluent process conduits and all inter subsystem process conduits are continuously monitored with pressure instrumentation. During normal flow conditions the back pressure on each influent, effluent or inter sub system process conduit is determined to have a normal, process-specific operating range. In the event that the pressure of any process conduit decreases below its normal range this would be the indication of a pumping failure or of a break in the process line. Should the pressure of any process exceed the normal range this would be the indicative of a plugged line or a valve failure in the closed position in that conduit or downstream from it. If the instrumentation senses any of these conditions at any of the associated processes, an alarm condition will be annunciated and a process exhaust fan will be turned on to evacuate that process space. Additionally, the supply of the overall process influent is immediately interrupted and the control system initiates a programmed, sequential shutdown of the entire process.

Within the ozonation subsystem 400, which may be contained in an enclosed trailer or other enclosed structure, ozone gas sensing equipment may be included. If the ozone instrumentation senses the presence of dangerous levels of ozone gas, an alarm condition will be annunciated and a process exhaust fan will be turned on to evacuate that process space. Also, the supply of the overall process influent is immediately interrupted and the control system initiates a programmed, sequential shutdown of the entire process.

The floor of each of the portable processing units containing the equipment of each of the subsystems 100, 101, 200, 300, 400, and 500 plus the boron laden concentrate treatment trailers may be coated with a chemical and water impervious coating. The exits and through floor outlets from each unit may be appropriately bermed so as to contain any spill. Within each portable processing unit, sensors may be mounted on the floor in at least two locations which will sense the presence of liquids on the floor. If these instruments sense the presence of fluids on the floor of any of the processing units an alarm condition will be annunciated so that an operator may take appropriate remedial action. The control system may include capability for the operator, if necessary, to immediately interrupt the supply of the overall process influent and allow the control system to initiate a programmed, sequential shutdown of the entire process.

It is, therefore, apparent that there has been provided, in accordance with the present invention, a method and apparatus for removal of contaminants from water that is used during the process of hydraulic fracturing. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A method for treating wastewater from an oil or gas well, the wastewater containing (a) suspended solids comprising at least one of a rock dust and a drilling mud, (b) residual water, and (c) organic contaminants including at least one of volatile organic compounds, oil or gas well drilling fluids, diesel oil, or natural crude oil, the method comprising: a) infusing a gas containing ozone into a stream of the wastewater, and causing oxidation and decomposition of the at least one of volatile organic compounds, oil or gas well drilling fluids, diesel oil, or natural crude oil in the stream of the wastewater to result in carbon dioxide, and water; b) adding aluminum chlorohydrate to the stream of the wastewater, and causing coagulation of the suspended solids to form suspended solids flocs in the stream of the wastewater, and causing coagulation of at least a portion of the residual water to form residual water flocs in the stream of the wastewater, wherein a concentration of the aluminum chlorohydrate in the stream of the wastewater is between about 0.001 to about 0.01 parts of the aluminum chlorohydrate per part of the wastewater; c) adding a flocculant to cause growth of the suspended solids flocs and growth of the residual water flocs to separable flocs entrained in the stream of the wastewater; d) delivering the stream of the wastewater through a filter medium of a filter, retaining the separable flocs on the filter medium of the filter, and discharging a clarified wastewater stream from the filter; e) causing precipitation of dissolved waste salts in the clarified wastewater stream, and separating precipitated waste salts from the clarified wastewater stream to produce a softened wastewater stream; f) delivering the softened wastewater stream to a first vessel, and injecting hydrogen peroxide solution and nano-sized bubbles of ozone into the softened wastewater in the first vessel to produce oxidized wastewater including residual ozone and trace residual organic matter in the first vessel; g) delivering a first oxidized wastewater stream from the first vessel to a carbon filter, causing decomposition of the residual ozone in the first oxidized wastewater stream, and separating the trace residual organic matter from the first oxidized wastewater stream to produce a second oxidized wastewater stream including remaining dissolved waste salts; and h) delivering the second oxidized wastewater stream to a first reverse osmosis membrane and causing reverse osmosis through the first reverse osmosis membrane, and separation of a first portion of the remaining dissolved waste salts from the second oxidized wastewater stream to produce a first permeate wastewater stream.

2. The method of claim 1, further comprising delivering the first permeate wastewater stream to a second reverse osmosis membrane thus causing separation and removal of dissolved boron salts to a produce a second permeate wastewater stream having a first concentration of dissolved boron salts of less than 5 parts per million, and a concentrate having a second concentration of dissolved boron salts greater than the concentration of dissolved boron salts in the first permeate wastewater stream.

3. The method of claim 2, further comprising causing precipitation of the dissolved boron salts from the concentrate by addition of magnesium hydroxide to the concentrate, and separating the precipitated boron salts from the concentrate to produce a first purified wastewater stream.

4. The method of claim 1, wherein the clarified wastewater stream is at an elevated temperature greater than the temperature of the first permeate wastewater stream, and wherein the method further comprises delivering the clarified wastewater stream through a first passageway of a heat exchanger while delivering the first permeate wastewater stream through a second passageway of a heat exchanger in counterflow with respect to the direction of flow of the clarified wastewater stream flowing through the first passageway of the heat exchanger.

5. The method of claim 1, further comprising measuring concentration of waste salts in the wastewater, and executing an algorithm by a programmable logic controller to produce the first permeate wastewater stream based upon the concentration of waste salts in the wastewater.

6. The method of claim 1, wherein the separating the precipitated waste salts from the clarified wastewater stream to produce a softened wastewater stream is performed within a single unbaffled horizontal flow vessel.

7. The method of claim 6, wherein the filter is comprised of a housing comprised of a bottom wall, a side wall, and an outlet; the filter medium is comprised of a bottom panel disposed along the bottom wall, and a side panel disposed along the side wall; and a first inflatable bladder disposed between the bottom wall of the housing and the bottom panel of the filter medium; and wherein the method further comprises:
  a) adding sodium carbonate to the softened wastewater stream to result in a pH of not less than 10.1 in the softened wastewater stream;
  b) delivering the softened wastewater stream into the housing of the filter through a floating boom conduit at a fluid velocity exiting the floating boom conduit of less than 0.15 feet per second;
  c) retaining the softened wastewater stream in the filter for at least 60 minutes;
  d) maintaining the fluid velocity of the softened wastewater stream in the filter at less than 0.0015 feet per second, thereby causing separation of precipitated carbonate salts from the softened wastewater stream to produce clarified fluid in the housing of the filter; and
  e) withdrawing the clarified fluid from the housing of the filter through a floating skimming funnel located distally from the floating boom conduit.

8. A method for treating wastewater from an oil or gas well, the wastewater containing (a) suspended solids comprising at least one of a rock dust and a drilling mud, (b) residual water, and (c) organic contaminants including at least one of volatile organic compounds, oil or gas well drilling fluids, diesel oil, or natural crude oil, the method comprising: a) infusing a gas containing ozone into a stream of the wastewater, and causing oxidation and decomposition of the at least one of volatile organic compounds, oil or gas well drilling fluids, diesel oil, or natural crude oil in the stream of the wastewater to result in carbon dioxide, water, and a residual water in the stream of the wastewater; b) adding aluminum chlorohydrate to the stream of the wastewater, and causing coagulation of the suspended solids to form suspended solids flocs in the stream of the wastewater, and causing coagulation of at least a portion of the residual water to form residual water flocs in the stream of the wastewater, wherein a concentration of the aluminum chlorohydrate in the stream of the wastewater is between about 0.001 to about 0.01 parts of the aluminum chlorohydrate per part of the wastewater; c) adding a flocculant to cause growth of the suspended solids flocs and growth of the residual water flocs to separable flocs entrained in the stream of the wastewater; d) delivering the stream of the wastewater through a filter medium of a filter, retaining the separable flocs on the filter medium of the filter, and discharging a clarified wastewater stream from the filter; e) delivering the clarified wastewater stream to a first vessel, and injecting hydrogen peroxide solution and nano-sized bubbles of ozone into the clarified wastewater stream in the first vessel to produce oxidized wastewater in the first vessel; f) delivering a first oxidized wastewater stream from the first vessel to a carbon filter, causing decomposition of residual ozone in the first oxidized wastewater stream, and separating trace residual organic matter from the first oxidized wastewater stream to produce a second oxidized wastewater stream; and g) delivering the second oxidized wastewater stream to a first reverse osmosis membrane and causing reverse osmosis through the first reverse osmosis membrane, and separation of a first portion of remaining dissolved waste salts from the second oxidized wastewater stream to produce a first permeate wastewater stream.

9. The method of claim 8, further comprising delivering the first permeate wastewater stream to a second reverse osmosis membrane and causing separation and removal of dissolved boron salts to a produce a second permeate wastewater stream having a first concentration of dissolved boron salts of less than 5 parts per million, and a concentrate having a second concentration of dissolved boron salts greater than the concentration of dissolved boron salts in the first permeate wastewater stream.

10. The method of claim 9, further comprising causing precipitation of the dissolved boron salts from the concentrate by addition of magnesium hydroxide to the concentrate, and separating the precipitated boron salts from the concentrate to produce a first purified wastewater stream.

11. The method of claim 8, wherein the clarified wastewater stream is at an elevated temperature greater than the temperature of the first permeate wastewater stream, and wherein the method further comprises delivering the clarified wastewater stream through a first passageway of a heat exchanger while delivering the first permeate wastewater stream through a second passageway of a heat exchanger in counterflow with respect to the direction of flow of the clarified wastewater stream flowing through the first passageway of the heat exchanger.

12. The method of claim 1, wherein the flocculant is an anionic flocculant.

\* \* \* \* \*